(12) United States Patent
Arnvidarson

(10) Patent No.: US 8,010,299 B2
(45) Date of Patent: Aug. 30, 2011

(54) DETERMINATION OF CHEMICAL OR PHYSICAL PROPERTIES OF SAMPLE OR COMPONENT OF A SAMPLE

(75) Inventor: Börkur Arnvidarson, Reykjavik (IS)

(73) Assignee: Chemometec A/S, Allerod (DK)

( * ) Notice: Subject to any disclaimer, the term of this patent is extended or adjusted under 35 U.S.C. 154(b) by 359 days.

(21) Appl. No.: 12/094,006

(22) PCT Filed: Nov. 16, 2006

(86) PCT No.: PCT/DK2006/000636
§ 371 (c)(1),
(2), (4) Date: Jul. 30, 2008

(87) PCT Pub. No.: WO2007/057016
PCT Pub. Date: May 24, 2007

(65) Prior Publication Data
US 2009/0024360 A1 Jan. 22, 2009

(30) Foreign Application Priority Data

Nov. 16, 2005 (DK) .................................. 2005 01601
Nov. 23, 2005 (DK) .................................. 2005 01646

(51) Int. Cl.
*G06F 19/00* (2006.01)

(52) U.S. Cl. ........................................................ 702/22

(58) Field of Classification Search .................... 702/22, 702/189; 356/451, 452; 600/301, 407
See application file for complete search history.

(56) References Cited

U.S. PATENT DOCUMENTS

| | | | |
|---|---|---|---|
| 5,379,764 A | 1/1995 | Barnes et al. | |
| 6,061,582 A | 5/2000 | Small et al. | |
| 6,859,764 B2 * | 2/2005 | Castellane et al. | 702/189 |
| 6,871,169 B1 | 3/2005 | Hazen et al. | |
| 2008/0252897 A1 * | 10/2008 | Arnvidarson et al. | 356/452 |

OTHER PUBLICATIONS

Pandit et al. "Data-dependent-systems and Fourier-transforms methods for single-interferogram analysis." *Applied Optics*. 1995. pp. 5945-5951.
Davis et al. "Function guide for the fourier transformation package-spire-uol-rep-0002220." *WP Fourier Transformation: Function Guide*. vol. 1.1. 2005. pp. 1-18.
Martens et al. "Multivariate Calibration." *John Wiley & Sons*. 1991.
Munck et al. "Chemometrics in food science—a demonstration of the feasibility of a highly exploratory, inductive evaluation strategy of fundamental scientific significance." *Chemometrics and Intelligent Laboratory Systems*. vol. 44. 1998. pp. 31-60.

* cited by examiner

*Primary Examiner* — Bryan Bui
(74) *Attorney, Agent, or Firm* — Merchant & Gould P.C.

(57) ABSTRACT

The present invention offers an alternative strategy for the correlation of interference information to chemical and/or physical properties of a sample. This strategy can be implemented in a method and a system, which offer substantial technical and commercial advantages over state of the art techniques based on interference spectroscopy. The method comprises the steps of: a. obtaining an interferogram and/or at least one interferogram element corresponding to a modulation of electromagnetic signal emitted from, transmitted onto or through, or having interacted with at least a part of the sample, b. performing i. at least one transformation of the interferogram and/or a segment of the interferogram and/or an interferogram element with at least one function, ii. optionally repeating i) for another segment of the interferogram and/or interferogram element, wherein the transformation does not comprise a Fourier Transformation if i) is conducted only once, thereby obtaining at least one score, c. correlating said at least one score to the at least one chemical or physical property.

55 Claims, 15 Drawing Sheets

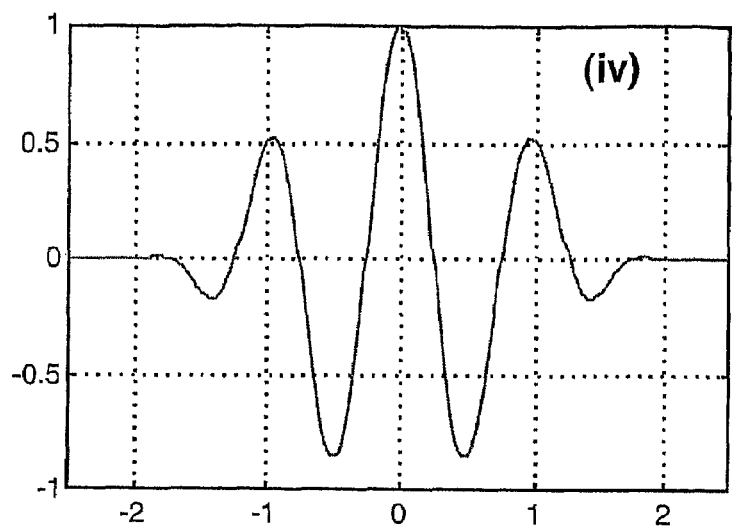
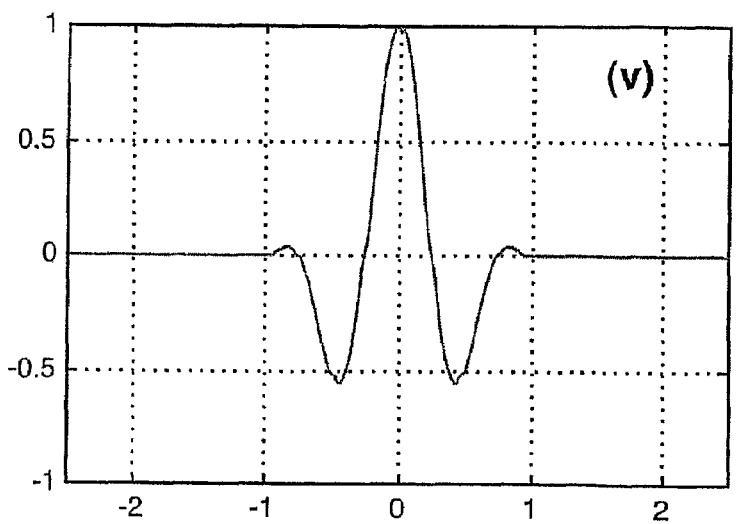
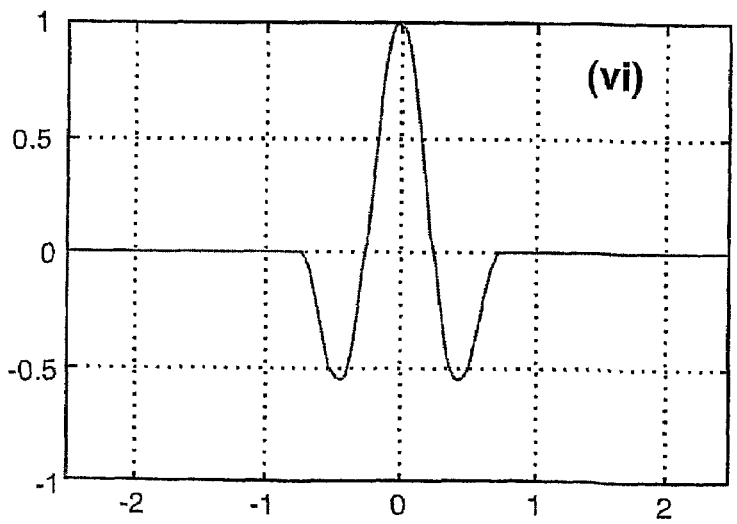
Fig. 1, continued

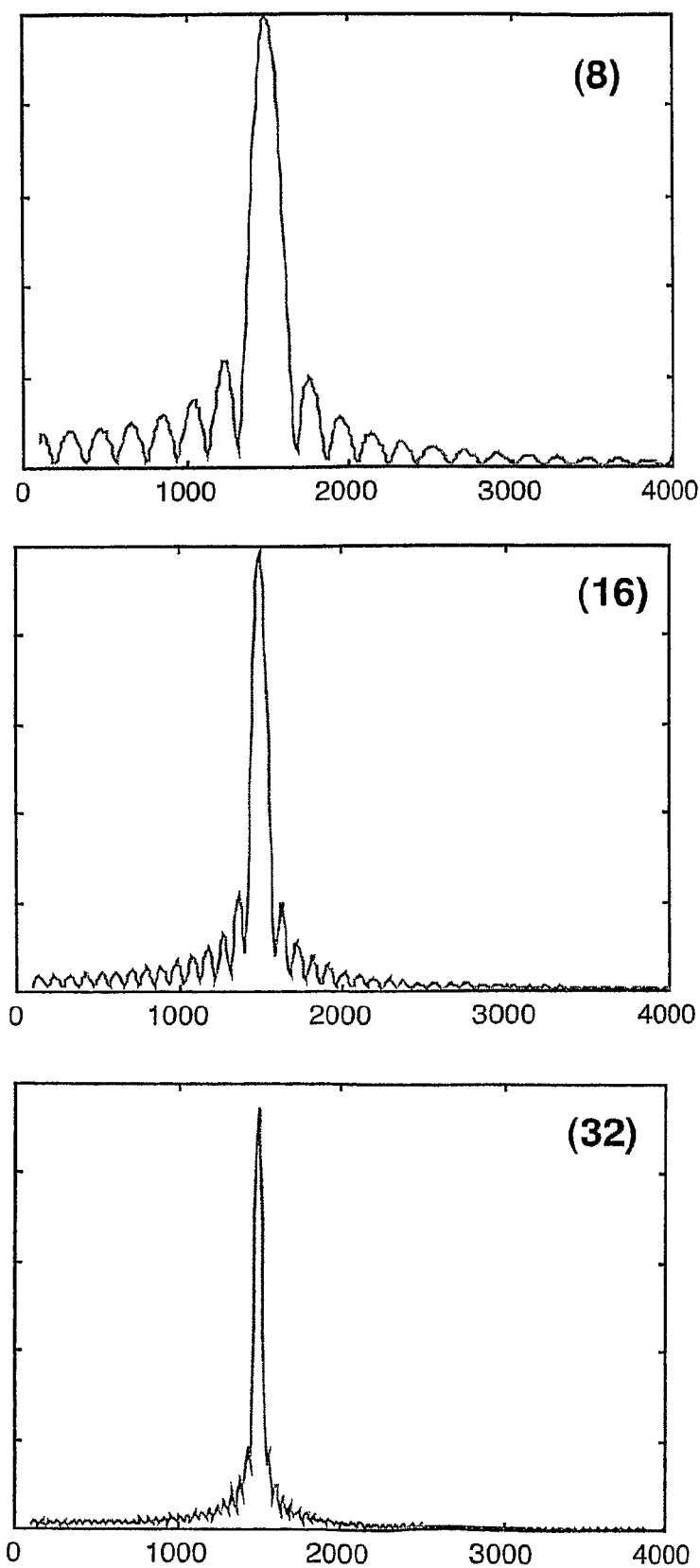
Fig. 2a, continued

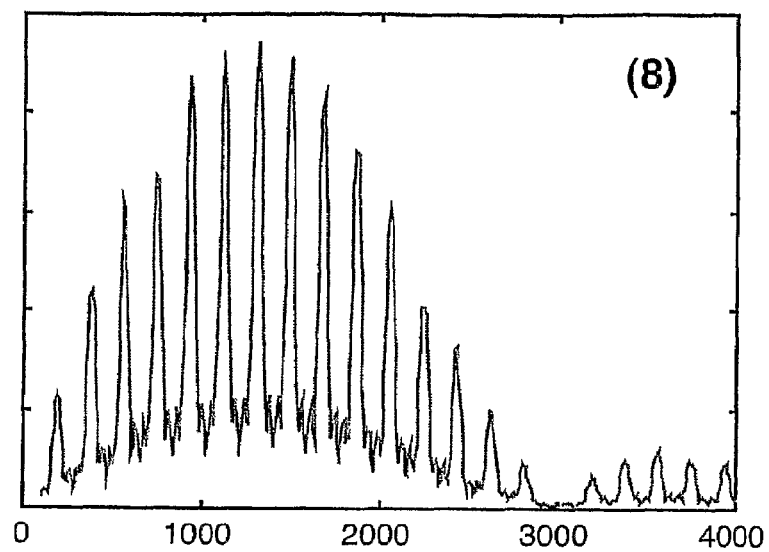
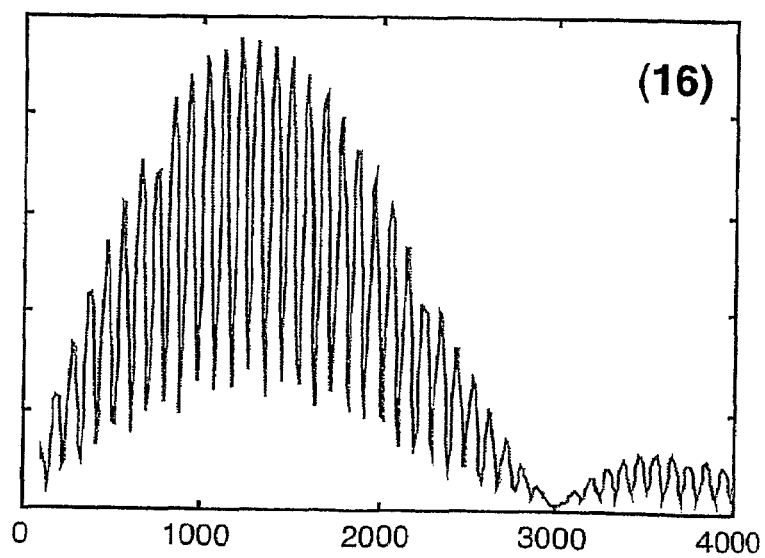
Fig. 2b, continued

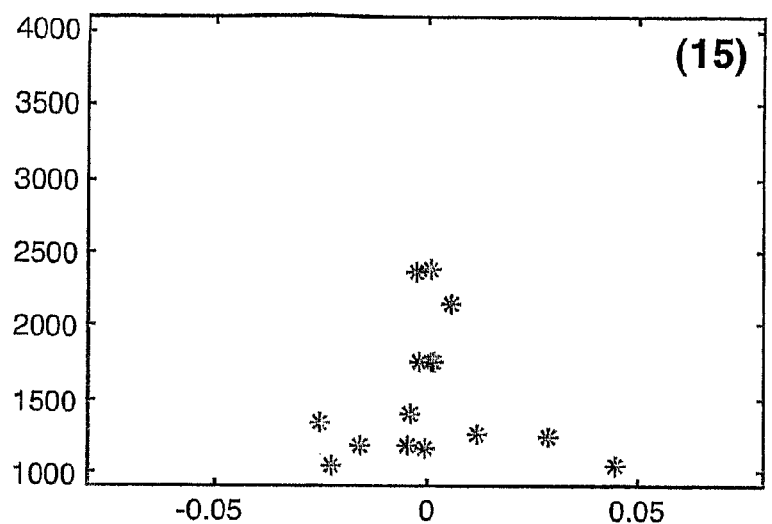
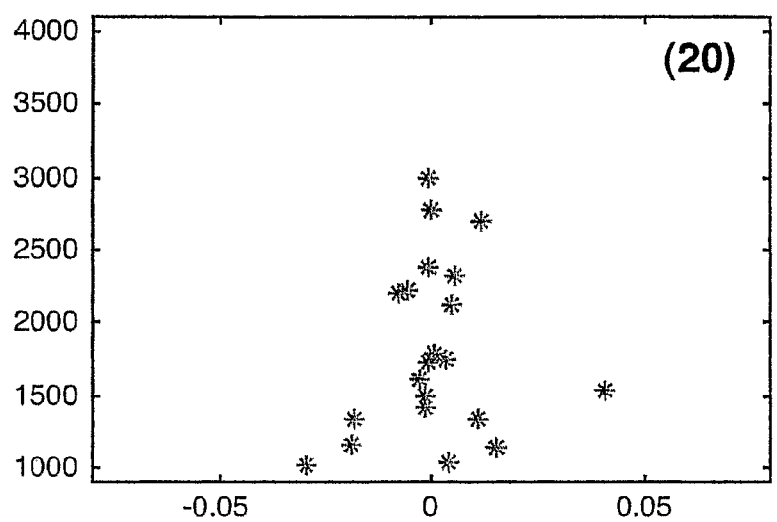
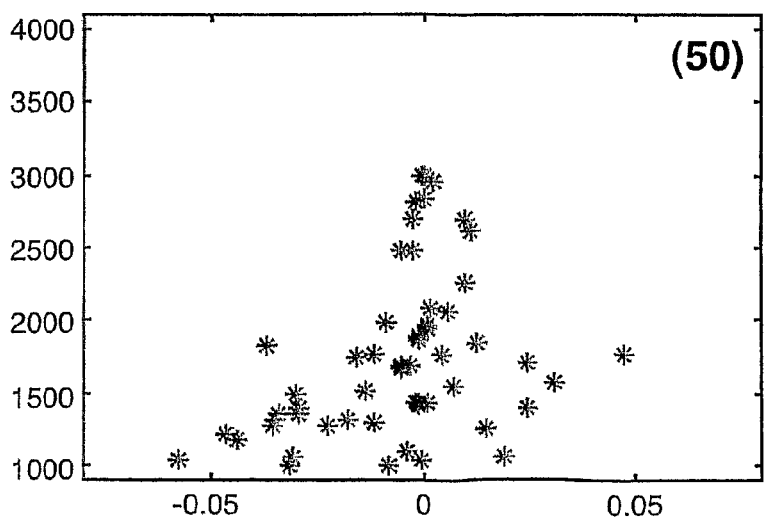
Fig. 3a, continued

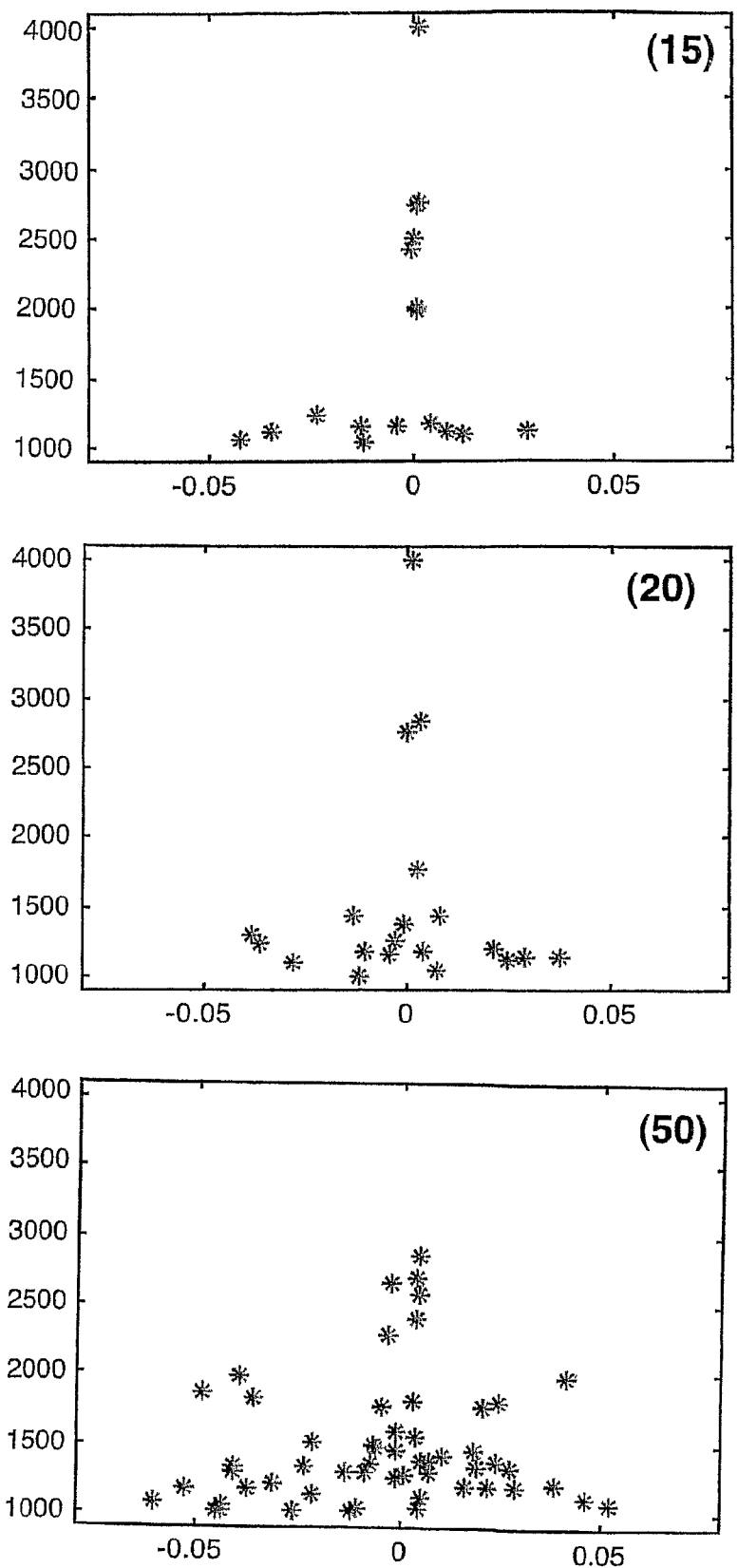
Fig. 3c, continued

DETERMINATION OF CHEMICAL OR PHYSICAL PROPERTIES OF SAMPLE OR COMPONENT OF A SAMPLE

FIELD OF THE INVENTION

The present invention relates to a method and a system for the determination of chemical or physical property of a sample or a specimen using spectroscopic techniques based on interferometry.

DESCRIPTION OF THE RELATED ART

Spectroscopic techniques, based on modulation, have been known for several years. One of these techniques is based on the work of Michelson in 1891 (A. A. Michelson, Phil. Mag. (5), 31, 256, 1891) and is generally referred to as "The Michelson Interferometer". Michelson interferometers are presently widely implemented in several commercial spectroscopic instruments for infrared measurement (ABB-Bomem Inc. USA, PerkinElmer Inc. USA, Thermo Nicolet USA, Foss Analytical Denmark). The Michelson Interferometer is based on separating a beam of light and then recombining the two beams after a path difference has occurred, thus causing interference in the detected light. Another spectroscopic method based on interferences of light is Fabry-Perot, which is based on transmitting light through two parallel partially reflecting mirrors, and the interference occurs when the distance between the mirrors is changed. Yet other spectroscopic techniques such as Nuclear Magnetic Resonance (NMR) use similar methods of interference data, generally described by the transformation of information observed in time and/or position domain into information in frequency or wavelength domain using Fourier Transformation (e.g. transformation of "Free Induction Decay" data to shift in FT-NMR).

In order to reconstruct spectral information, the interference information (interferogram) is numerically transformed by fast Fourier Transformation. The spectroscopic methods based on interference techniques are therefore often call Fourier Transform spectroscopy (abbreviation FT).

Interference spectroscopy generally offers several advantages over other spectroscopic techniques, such as monochromator, prism, filters or magnetic sweeps. FT based spectrophotometers have virtually replaced those techniques in state of the art instruments. The most pronounced advantages of FT techniques are; wavelength/frequency stability, high scan-speed, high signal throughput, high spectral resolution, single detector, stable spectral response. A comprehensive description of FT-IR spectroscopy is given by P R Griffiths and J A de Haseth in "Fourier Transform Infrared Spectrometry", John Wiley & Sons, 1986 (ISBN 0-471-09902-3).

FT spectrophotometers are primarily used to record spectral information, which is used for qualitative and/or quantitative analysis of a sample. These spectroscopic methods have been practiced for a long time and are therefore based on extensive experience. Where FT spectroscopy and personal computers have become more common they have been applied to the traditional methods, becoming largely the method of choice in spectroscopic analysis. With the introduction of new techniques, new applications have been developed and also new methods, e.g. multivariate calibration, have been implemented to make the most of the advantages. Thus industrial applications of spectroscopic methods have increased in number, taking advantage of the flexibility and speed of these methods.

Modern production techniques and computers have been essential in the increasing application of FT spectroscopy, since mechanical and electronical design and construction of such instruments is complicated and requires high precision and sometimes exotic materials. The computers are also necessary to perform the computationally intensive transformation from the "abstract" interference information to the "tangible" spectral information on which spectroscopists base their analysis. To take full advantage of the spectral information it is also necessary to rely on computers to apply the often-complicated multivariate calibration models needed.

Traditionally assessment of chemical or physical properties of a sample has been based on information from one, two or only few discrete wavelength(s) (e.g. absorption/transmittance or emission at a wavelength). This is partly due to the inherent simplicity of interpreting univariate correlations and partly due to the difficulty of performing complex manual calculations (univariate is the condition where there exists a single source of information that substantially only represent a property in question and is not affected by other properties). With the application of multivariate calibration methods for assessment, which has become more common with the availability of personal computers, it has been more common to perform assessment of more complicated problems, e.g. spectral interferences, overlapping spectral features, non-linearity or co-correlation. The various methods, typically applied in the field of chemometrics, offer solution to system where there exists strong colinearity between measured variables as well as multivariate correlation to the property in question.

These rather complicated assessments have become possible with the use of various multivariate statistical methods, as typically applied in the field of chemometrics, e.g. as described by H Martens and T Naes in "Multivariate Calibration", John Wiley & Sons, London, 1989, in particular multivariate calibrations, e.g. MLR, PLS, PCA/PCR, ANN just to mention a few. Generally these methods are based on using information from a plurality of variables, e.g. spectral information, to determine and/or compensate for complex co-variance, e.g. effects in the spectral information. Ideally the number of spectral data points needed is substantially greater or equal to the number of sources of variation or effects present in the measurements.

Spectroscopy is generally viewed as the analysis of spectral property at a given wavelength or frequency, in relation to chemical or physical properties. A typical spectroscopic application is the study of extinction or emission properties associated with a chemical component. Few systems, but in particular systems consisting of a single or only few components or physical factors, can be looked at as simple spectral systems, defined by limited or no spectral interferences, e.g. an univariate system. Here spectral interferences are defined as changes at a spectral wavelength caused by or reflecting status of the system, e.g. changes in concentration, temperature, pressure etc., other than the status of the property of interest.

An example of spectral interferences is "overlapping" extinction or emission, a general term of e.g. absorption of two components at close wavelengths. As this is the case in the study of most systems, experience has shown that although systems free of spectral overlap are rare, then the case of "total overlap" is practically non-existent, since there are usually one or more wavelength(s) which do not completely share spectral response and usually different spectroscopic regions or techniques offer spectral separation. In the case of "overlapping" systems several techniques have been developed to aid the researcher in search of the underlying property. Examples of such methods are curve resolution in spectroscopy and multivariate calibration in chemometrics.

Looking at the field of spectroscopic measurements, e.g. the determination of the spectral properties of a system, which is an important aspect of spectroscopy and traditionally is the task preceding spectral analysis, the current state of the art technology offers several methods and techniques. Common for most of these is that they deal with a similar problem of "spectral overlap", not as discussed above in the interpretation of spectral properties but in the determination of these properties. The most common of such spectral overlaps are caused by limited spectral resolution in the recording of spectral data since it is rarely possible to isolate a single "pure" wavelength. Rather a waveband of certain bandwidth is recorded, the form of which is determined by the properties and/or application of any given spectrograph.

In practical application most techniques offer conditions where the "spectral overlap" in the recording of spectral information is limited or negligible in spectral analysis. At worst the spectral resolution is usually known which allows it to be taken into consideration and often compensated for, e.g. by methods such as spectral deconvolution.

Theoretically, most methods offer the potential of unlimited resolution while this can not be obtained in practical applications. One method, where unlimited spectral resolution is in theory obtainable is the method of interferometry, generally combined with the method of inverse fourier transformation. Increasing resolution is obtained by increasing the extent of interference, which for instance in a Michelson interferometer is brought about by increasing the optical path difference (OPD) and in FT-NMR spectroscopy by increasing the sampling time. On the other hand this is done at a price, since the requirement to physical and mechanical stability and to some extent time limit the applicability, so usually a suitable "trade-off" is made since extreme requirements result in costly and fragile instruments.

SUMMARY OF THE INVENTION

The Fast Fourier Transform (FFT) methods applied in the current art have several drawbacks:
1. Each spectral property determined by inverse Fourier Transform of an interferogram is determined on the bases of all elements of the collected interferogram. Under ideal conditions this offers some benefits, such as increased suppression of random noise in the interferogram but in practical applications there are interferogram elements and/or regions which contribute less information than random noise and are therefore not beneficial in the determination of the spectral property.
2. The spectral sample points in the spectrum obtained by discrete inverse Fourier Transform is determined by the extent of representation of the interferogram resulting in two noticeable drawbacks:
   a. It is generally not the property of inverse Fourier Transformation to determine the value of the spectrum at a specific frequency corresponding to a peak value in the spectrum.
   b. To obtain a suitable resolution of the spectrum, e.g. to measure certain peak values, requires an interferogram of a minimum length leading to complications in the instrument such a long OPD in a Michelson interferometer leading to reduced mechanical stability and speed.
3. A closer sampling to improve the resolution and/or determination of a feature in the interferogram is generally not performed as the resulting frequencies in the spectrum are outside the sensitivity of the instrument.
4. The inverse Fast Fourier Transformation requires that all data elements of the interferogram be collected at equal spacing in the interference domain. Since interferogram typically consists of regions of very variable range, with respect to intensity, alternative methods of data collection could benefit the harvesting of the significant information.

Accordingly, in one aspect the present invention relates to A method for the determination of chemical or physical property of a sample or a component of a sample comprising the steps of:
   a. obtaining an interferogram and/or at least one interferogram element corresponding to a modulation of electromagnetic signal emitted from, transmitted onto or through, or having interacted with at least a part of the sample,
   b. performing
      i. at least one transformation of the interferogram and/or a segment of the interferogram and/or an interferogram element with at least one function,
      ii. optionally repeating i) for another segment of the interferogram and/or interferogram element,
         wherein the transformation does not comprise a Fourier Transformation if i) is conducted only once,
      thereby obtaining at least one score,
   c. correlating said at least one score to the at least one chemical or physical property.

And in second aspect of the invention relates to a system for the determination of chemical or physical property of a sample or a component of a sample comprising
   a. an interferometer for obtaining an interferogram and/or at least one interferogram element corresponding to a modulation of electromagnetic signal emitted from, transmitted onto or through, or having interacted with at least a part of the sample,
   b. processor for performing
      i. at least one transformation of the interferogram and/or a segment of the interferogram and/or an interferogram element with at least one function,
      ii. optionally repeating i) for another segment of the interferogram and/or interferogram element,
         wherein the transformation does not comprise a Fourier Transformation if i) is conducted only once,
      said processor including means for obtaining at least one score from the transformation, and
   c. means for correlating said at least one score to the at least one chemical or physical property.

By the present invention several of the above mentioned drawbacks are eliminated allowing for simpler and more robust methods and instruments

DETAILED DESCRIPTION OF THE INVENTION

Terms:
Chemical or physical property of a sample Typical chemical properties are the concentration of one or more compounds, composition or pH of a sample and typical physical properties are temperature, pressure, colour or viscosity of a sample.

Interferogram element The observed result of an interference modulation of spectral information into a function of position, distance (e.g. OPD) or time (e.g. FID). Interferogram element is also referred to as digitised interference data points.

Interferogram In the present context a collection of interferogram elements, or a function defining interferogram elements, preferably where the said function is defined for all representation of the modulated domain, such as position/distance/time.

Interferogram segment In the present context a sub collection of adjacent interferogram elements in a measured interferogram, or a section of the analytical function defining the interferogram corresponding to a range of positions in the interference domain.

Loading function A discrete or continuous function used to transform an interferogram, an interferogram segment or element to a score. Preferably by calculating the inner product between the loading function and the interferogram. Often loading functions are orthogonal or near orthogonal, typically representing a sub-space in interferogram matrices, used for multivariate models, which correlates to the property being modelled.

Inner product Defined as:

$$\text{Amplitude}(v) = \sum_i I(x_i) * f(x_i),$$

where I is the interferogram data, f is a periodic function (or in general a continuous or discrete functions of weights), x is the domain (e.g. position, distance or time) of the interferogram and i is the index to discrete interferogram elements.

Product segment A segment of a loading function, where the loading function has active weights. Outside of a product segment the loading function has the weight of zero. Only corresponding segment of the interferogram is active for the calculation of scores.

Interferogram period/$2\pi$-period A period typically between integer values of a function where a cyclic function is balanced, based on a given frequency and position in the interferogram domain, e.g. determined by the product of the frequency and position. An example of a period is the product of frequency, for instance 1,500 cm$^{-1}$, and Optical Path Difference, for instance in the range −0.01 and 0.01 cm, between any integer value, e.g. [−1,0], [0,1], [1,2] etc.

Balanced function A continuous function which integral is zero, extended to discrete functions, which sum is zero or close to zero.

Orthogonality Two functions are orthogonal when the inner product of the functions is zero. For the purpose of the current subject, this definition is extended to also include "near orthogonal" functions, illustrating that such functions define a meaningful sub-space of a data set, e.g. a matrix, in the content of a multivariate calibration. An example of such "near orthogonal" functions are loadings of a PLS calibration (latent variables).

Proximal data point or proximal interferogram element Data point or interferogram element corresponding to proximal values of positions/distances/frequencies in the interferogram.

Uneven sampling In the present context uneven sampling refers to shifts in sampling at values in the modulation domain (e.g. OPD or FID). Examples of such shifts are shifts ariseing from differences in the control of collection between two instruments, constant or proportional, jitter due to mechanical/electrical interference or the like. However, uneven sampling may also refer to intentionally collecting interferogram elements with varying density/spacing in position of the modulation domain to obtain a better resolution of sections of the interferogram, such as the centreburst.

Modulation domain/interference domain/interferogram domain??? Also referred to as the interferogram domain or interference domain wherein the interferogram elements correspond to values of position/distance/time. An example is Optical Path Difference (OPD) in a Michelson interferometer.

Status of the modulation A specific value of position/distance/time in the modulation domain.

Centreburst The central peak of the envelope of an interferogram, in an interferogram. For a Michelson interferometer this peak is centred on OPD=0.

Extent of representation The range of position/distance/time.

Score or score value Represents the weight, e.g. contribution or content, of a loading function in an interferogram. A typical score is the inner product of a loading function and an interferogram. Generally, when dealing with discrete function, the sum is adjusted for the number and spacing of the included element, as to retain the property of a continuous integral.

Scaling A value given to a dataset, loading function, interferogram, interferogram segment or element typically for the purpose of suppressing or highlighting information Prediction model In the present context a mathematical model transforming observed or calculated values, e.g scores, into an estimated value of a chemical or physical property or to a prediction of a the presence of a specific state.

Using several preferred embodiments of the present invention it has surprisingly been found that by applying methods novel in the field of interference spectroscopy that applications and tasks, not easily performed using state of the art methods of spectroscopy can be solved in satisfactory manner, under conditions where mechanical and/or electronical construction allow the production of improved and commercially feasible instruments.

Several of the preferred embodiments of the present invention are suitable for applications where the composition or condition of the sample is not restricted, e.g. spectroscopic analysis of unknown sample, or determination of property of unknown component in a known sample, e.g. identification of one or more components of a sample, while other equally preferred embodiments are suitable for applications where composition and/or condition of the sample are known, e.g. determination of the amount of components in a sample drawn from a group of samples of similar origin (for instance properties in human blood sample, fruit juice, or a sample, such as wine during, fermentation).

When inverse fourier transform spectroscopy can be looked at as being the determination of the weight or score of a spectral element in the interferogram, e.g. intensity at a wavelength, several preferred embodiments of the present invention consider only one, but preferably more than one sections of the interferogram for the task of obtaining spectral information, preferably where the purpose of obtaining spectral information is for the determination of a chemical or physical property of a sample or a component of a sample. Typical spectral properties are the recording of spectral response in extinction or emission spectroscopy, e.g. the recording of a spectrum such as UV/Vis, NIR, IR, NMR, MS, X-Ray, Fluorescence or Raman, just to mention few. Other typical use of spectral properties is the determination of chemical properties such as concentration of one or more compounds, composition or pH of a sample or physical properties such as temperature, pressure, colour or viscosity of a sample.

An interferogram as typically encountered in spectroscopic interferometry is a modulation of spectral information into a function of position, distance (e.g. OPD) or time (e.g. FID), i.e. interferogram domain, where the interferogram typically is presented in a periodic function, often as a number of cosine or sine periodic function(s). Thus each element of the interferogram (interferogram being the observed result of the interference modulation) is considered to be a sum of these periodic functions and in inverse fourier transformation each point in the spectrum is determined as the weight or score of a cosine or sine function in the interferogram, a task comparable to the determination of a set of coefficients (e.g. the weight of each function) by simultaneously solving a set of equations.

The present invention shows, that an interferogram can to some extent be viewed as a spectrum of highly correlated spectral features, where the correlation in interferogram is the correlation of periodic functions. Thus it has surprisingly found that several methods traditionally applied to the treatment of spectrum can be adapted to the treatment of interferogram data in order to determine chemical or physical property of sample or component of a sample, which traditionally are determined from a spectrum. The result of several preferred embodiments of the present invention allow substantial simplification of the requirements to the generation and recording of interferogram resulting in the ability to obtain improved information quality under condition normally applied, compared to the state of the art methods, and more importantly to obtain comparable information quality under substantially simplified systems. In a preferred embodiment the number of scores is less than the number of interferogram elements in the analysed interferogram.

Furthermore, it is preferred that the method according to the invention is applied to a multivariate system.

In order to obtain amplitude or intensity of "pure" spectral information at two wavelengths it is necessary to record an interferogram where the two corresponding periodic functions have gone from a state of being in phase through a state of being out of phase to a state where they are again in phase with each other, e.g. fulfilment of orthogonality requirement. Thus two functions closely spaced in frequency have to be represented in longer interferogram than two functions spaced further apart in frequency in order to obtain resolution of the frequencies. Under these conditions the changes in amplitude of the frequency at one of the frequencies does not affect the estimated amplitude at the other frequency, but if the interferogram is substantially shorter then amplitude changes at one of the frequency affects the determination of frequency of the other.

The result of the inverse fourier transformation of the interferogram at a given frequency is equivalent to the inner product of the values of the interferogram and corresponding discrete values of cosine or sine function of the frequency in question, e.g. the sum of the product of each of the interferogram elements and corresponding values of a cosine or sine function, using the same weight on all elements, as given in the following equation where I is the interferogram data, $f$ is a periodic function (or in general a continuous or discrete functions of weights), x is the domain of the interferogram and i is the index to discrete interferogram elements.

$$\text{Amplitude}(v) = \sum_i I(x_i) * f(x_i)$$

If two frequencies are to be determined under conditions where they are independent of each other then the size of the interferogram must fulfil that the discrete inner product of the two corresponding cosine or sine function must be zero. This determines the dependency of obtainable spectral resolution on the extent of the interferogram, e.g. maximum OPD represented in an interferogram from a Michelson interferometer or length in time in the FID recorded in FT-NMR spectroscopy.

Several preferred embodiments of the present invention include calculation of inner products of interferogram elements and periodic functions, preferably for the determination of amplitude at frequencies under conditions where spectral resolution, e.g. orthogonality, requirements are not fulfilled, e.g. the length of interferogram is not adequate to allow complete separation of given frequencies. In many preferred embodiments where inner product only represent a section of an interferogram, preferably where the section of the interferogram is small, such that the interferogram is treated in 2 segments or more, more preferably in 10 segments or more, or even where individual interferogram elements are treated separately, it has been found that such use of interferogram data is well suited for the determination of spectral properties and/or the determination of chemical or physical property of a sample or a component of a sample, an often necessary and preferred property is the determination of the interferogram element position in terms of interference domain units. Often the effect of several embodiments of the present invention can be viewed as carrying out the calculation of an inner product, where individual weight, preferably pre-determined, is given to each product element, some of which can be zero while other are different from zero.

If the individual products of interferogram element and the corresponding element from a single periodic function, (i.e. product elements) are plotted in a graph versus the domain of the interferogram it represents a graph of discrete elements of a function. Due to the nature of the interferogram and the periodic function the resulting function is a digitised representation of the continuous product function having many of the properties of a spectrum, as will also a function representing the cumulative sum of the products over short range of the interferogram.

Some embodiments of the present invention use individual elements of the interferogram, while it is generally preferred to use elements corresponding to a product of interferogram and a loading function. One problem often associated with the use of interferogram elements directly is that even though each interferogram element reflects modulated spectral information it does also reflect other, often interfering, sources of information, e.g. noise or other properties of the data collection system. Further, although interferogram data are usually gathered at very precisely determined position in the interferogram domain, this position sometimes is slightly altered under conditions, such as when means are used to determine the domain position and such means slightly change properties, e.g. due to maintenance, or when two different instruments, with different positioning means, are intended for the use of the same model for the determination of chemical or physical property of a sample or a component of a sample, by referring to interference domain position, rather than an index of the interferogram element.

Many preferred embodiments of the present invention use as loading function cosine and/or sine functions (e.g. periodic functions) to produce product elements (i.e. the product of an interferogram element and function of weights, e.g. a periodic function), when determining chemical or physical property of a sample or a component of a sample. More preferably product elements and product segments are included in a manner, which improves stability of the determination with regard to factors affecting the determination of the interferogram. Preferably by choosing position and range in the interferogram, e.g. an interferogram section, where such properties are obtained. One such preferred condition is where product elements are selected in a manner that when considered in pairs, groups or as a whole, represent balanced sum of the periodic function. Another preferred condition is the use of a periodic function where cycles are balanced, e.g. the integral of the function or the sum of discrete points of the function are equal to zero when considering a section. The net effect of these embodiments is thus making the sum of products, e.g. inner product, stable against several sources of variation in the interferogram such as constant or slowly varying background signal, slight change in the position in the interferogram domain, or in general systematic error signals, e.g. signal substantially not reflecting spectral properties, having substantially different cycle period. Such property called orthogonality or near orthogonality. One much preferred embodiment of the present invention uses as a periodic function a cosine and/or sine function extending for one or more cycle(s) each of length $2\pi$ or close to $2\pi$, preferably the position of the cycles in the frequency domain are chosen such that the values of the function at the boundaries are close to zero or in general where the balance of the function at the position is substantially insensitive to the effect of its discrete nature, for example if using a cosine function the position of a cycle is preferably equal or close to between $(2i\pm\frac{1}{2})\pi$ and $(2i\pm3/2)\pi$, where i is an integer and correspondingly when considering sine functions the position of a cycle is preferably equal or close to between $(2i)\pi$ and $(2i+2)\pi$ or $(2i+1)\pi$ and $(2i+3)\pi$.

When measuring interference data it is often possible to obtain values at predefined position in the interference domain, e.g. measurement of an interferogram at a predetermined OPD in a Michelson interferometer, while often it is more preferably to obtain values at known positions, e.g. when a regulating means are used to control data acquisition and the regulating means have a known property rather than a predetermined property, e.g. when the OPD of interferogram in a Michelson interferometer is determined by a light source, e.g. a laser or laser diode, of known frequency. When data element(s) of an interferogram are obtained at known, rather than predetermined positions in the interference domain, it is often preferred to use knowledge of such position to estimate or determine interference (modulation) property at a predetermined position, such information then being used for the determination of a chemical and/or physical property of a sample or a component of a sample. In embodiments where interferogram are obtained at known position, and in particular when using standardised models, i.e. models which are developed in one system under given conditions and applied under different conditions or in another system, it is preferred to use product segments, as the score of product segment is substantially not affected by domain position of interferogram elements, e.g. as a result of properties of data acquisition regulation means, for instance difference in frequency of a light source used to control data acquisition.

Accordingly, in one aspect the invention relates to a method for the determination of chemical or physical property of a sample or a component of a sample comprising the steps of:
a. obtaining an interferogram and/or at least one interferogram element corresponding to a modulation of electromagnetic signal emitted from, transmitted onto or through, or having interacted with at least a part of the sample,
b. performing
  i. at least one transformation of the interferogram and/or a segment of the interferogram and/or an interferogram element with at least one function,
  ii. optionally repeating i) for another segment of the interferogram and/or interferogram element,
    wherein at least one transformation involves the calculation of an inner product between a loading function expressed in terms of interference domain position and interferogram representation expressed in interference domain position, and/or an inner product between a loading function expressed in terms of an interference element position and obtained interferogram elements,
  thereby obtaining at least one score,
correlating said at least one score to the at least one chemical or physical property.

Since the interferogram is generally discrete the loading function, e.g. a periodic function usually does not exactly numerically balance in a period of a cycle of a periodic function. Therefore it is often preferred to extend the interferogram section beyond the cycle, preferably where such extension is adjusted as to better balance the periodic function over a segment. This is preferably achieved by including a single or few interferogram elements closest to the section and assigning weights to the corresponding elements of the periodic function. Another equally preferred embodiment is to estimate values of the interferogram at positions not measured, e.g. by interpolation to obtain discrete values or by determining one or more parameters of a continuous function, or performing a numeric integration of the product of the interferogram data and loading function, thus obtaining better balance of a product segment.

Accordingly, in one aspect the invention relates to a method for the determination of chemical or physical property of a sample or a component of a sample comprising the steps of:
c. obtaining an interferogram and/or at least one interferogram element corresponding to a modulation of electromagnetic signal emitted from, transmitted onto or through, or having interacted with at least a part of the sample,
d. performing
  i. at least one transformation of the interferogram and/or a segment of the interferogram and/or an interferogram element with at least one function,
  ii. optionally repeating i) for another segment of the interferogram and/or interferogram element,
    wherein at least one data point forming the interferogram, the segment of the interferogram or the interferogram element is based on at least one proximal point.
  thereby obtaining at least one score,
correlating said at least one score to the at least one chemical or physical property.

One preferred method of the present invention is to develop a model for the determination of a chemical and/or a physical property of a sample or a component in a sample, on a first instrument, preferably where said model is based on balanced or substantially balanced interferogram section(s), and then applying said model on second interferogram data obtained on a second instrument (such second instrument is also understood to be the said first instrument, operated in a different manner than during model generation), preferably where requirements to the position of interference elements of the interferogram obtained on the second interferogram are to some extent different than positions on the first instrument. Such difference can often be either an absolute or proportional shift in the general position of interferogram elements, variable shift in the position of substantially individual interferogram elements, or as missing or additional elements in a least one region of the second interferogram data obtained on the second instrument, compared to the first interferogram data obtained on the first instrument. Significant shift, exclusion or addition of elements being defined such, that if the model was considered as the sum of weighted sum of individual elements, as opposed to interferogram section, then the effect on prediction of property using the model on the second instrument would be substantially equal to or grater than the obtainable or observed precision (e.g. reproducibility) of the model on the first instrument. Thus many preferred embodiments of the present invention allow a model being obtained under first conditions, with respect to position and/or number of obtained interferogram data elements, which substantially retain model performance when applied to data obtained under second, often different conditions. Accordingly, in one aspect the invention refers to a method of model for a system according to the invention using a calibration developed on a first instrument, or instrument operated under first conditions, the applying the model on a second instrument, or on the instrument operated under second conditions, the performance of the model, with respect to accuracy and/or precision, preferably not being significantly affected.

The inverse fourier spectroscopy, in a simple form, can be viewed in terms of determining the score of a cosine loading function on the entire interferogram. As defined above, the cosine loading function can be viewed as a number of periodic segments, e.g. balanced segments, and thus, using the additive property of inner product, it follows that the inverse fourier spectroscopy is equivalent to determining the score of all segments and combining the result in a sum. Therefore, the inverse fourier spectroscopy, for the determination of spectral intensity of a single frequency is equivalent to deriving segment products for all periods and combining them with equal weight, e.g. the weight 1. Many preferred applications of the present invention concern the determination of properties of a system, other than spectral intensity, and in many of these preferred applications the individual product segments are combined with individual weights, preferably where weights of at least some of the segment products is different from 1, including weights of 0. Preferably such weights are determined in such a manner that the application in question has good model performance, e.g. as determined by prediction ability.

Similarly many preferred embodiments of the present invention take advantage of optimising the determination of interferogram elements, with respect to positioning and intervals in the interferogram domain. The application of inverse fourier transformation assumes that all elements are equally spaced. Further the spacing of the elements defines the spectral range (e.g. maximum frequency) of the estimated spectra, in such a manner that reduction in the spacing increases the spectral range, this increased spectral range often falling outside the working spectral range of the spectrograph and thus serving little purpose. In order to improve signal quality, signal relevance or balance of a product element or product segment several preferred embodiments of the present invention determine interferogram elements at spacing which is smaller than is generally determined when the interferogram is used for inverse fourier transformation, e.g. which would lead to the extension or even substantial extension of the frequency range beyond the rang of interest, for instance often controlled by the wavelength of a laser or a laser diode of visible light when measuring in the near-IR and mid-IR spectral range, often spacing in embodiment s of the present invention is 2 times smaller or even 4, 8, 16, 32 or even 64 times smaller than spacing typically used in FT spectroscopy. In terms of modulated frequency the spacing of the interferogram elements is preferably less than 2 times the frequency of the spectral element investigated of the highest frequency, even preferably less than 4, 8, 16, 32 or even 64 times that frequency.

In the present invention it is often preferred to use interferogram elements which are unevenly spaced, preferably for the purpose of improving the signal quality or signal relevance of a product segment. Under conditions where interferogram elements are evenly spaced and equally weighed in the determination of spectral properties, for instance as is the case in inverse fourier transformation, then it is evident that elements which are large in absolute value, compared to the majority of the interferogram elements weigh more heavily in the final results. Preferably these elements are determined with as great quality as possible and given that all interferogram elements are determined under substantially identical conditions then an improvement in the number of elements representing such a region will improve the final result. Thus it is preferred in several embodiments, that in certain regions of an interferogram preferably where changes in interferogram intensity are rapid as a function of interferogram domain or absolute signal values are high, e.g. at or close to a centre burst or at locations where the interference modulation causes local interferogram structures, that such regions are measured with less spacing of interferogram elements than in other and often larger regions. Therefore, in one aspect the invention relates a method for the determination of chemical or physical property of a sample or a component of a sample comprising the steps of:

e. obtaining an interferogram and/or at least one interferogram element corresponding to a modulation of electromagnetic signal emitted from, transmitted onto or through, or having interacted with at least a part of the sample, f. performing
  i. at least one transformation of the interferogram and/or a segment of the interferogram and/or an interferogram element with at least one function,
  ii. optionally repeating i) for another segment of the interferogram and/or interferogram element,
    wherein some regions of the interferogram are measured with different spacing of interferogram elements than in other regions,
  thereby obtaining at least one score, g. correlating said at least one score to the at least one chemical or physical property.

Conventional methods for the generation of spectral information, e.g. attenuation or emission of electromagnetic radiation, on the bases of interferometry data, e.g. by fourier transformation, derive such spectral information at intervals equally spaced in frequency domain, where the frequency and spacing are determined by conditions, under which the interferogram is obtained, e.g. spacing of interferogram elements and length of the interferogram. Embodiments of the present invention allow the determination of spectral information at frequency and spacing, as do conventional methods, while several preferred embodiments determine spectral information frequencies where determination of property of a sample or a component of a sample is reliable and stable. Embodiments of the present invention use periodic function where the frequency of such periodic function is selected without any dependency on the position or spacing of interferogram data elements in the domain of the interferogram. Frequencies of periodic functions are therefore selected with reference to the determination at hand, for instance reflecting position and/or shape of a spectral feature, e.g. an attenuation or emission band. Accordingly, a preferred embodiment may select periodic functions unevenly spaced in the frequency domain of the spectral property of the interferogram. Several embodiments further include periodic functions with frequency spacing, which is smaller than the maximum resolution defined by the properties of the interferogram, e.g. length of the interferogram. Further embodiments of the present invention feature loadings reflecting frequencies, e.g. through the use of periodic function, of close spacing, closely representing continuous frequency band, preferably at spacing, where substantially no influence would be observed by the shortening of the frequency spacing between two frequencies, when determined as significant contribution to the score of such loading in a measured interferogram.

In analogy to analysis of spectrum, where accurate frequency or wavelength position of a spectral feature is of interest, then in many preferred embodiments of the present invention it is of interest to know or determine accurate domain position of interferogram elements, e.g. not only knowing precisely relative position of each interferogram elements. To relate chemical or physical property to interferogram data there are two equally preferred methods to compensate for variations in the position of in interferogram element in the interferogram domain. Firstly several embodiments include methods where modulation information at a given position is estimated or determined, e.g. by interpolation of a sort, based on one or more interferogram elements determined at position close to the given position, e.g. proximal data. Secondly many preferred embodiments include methods where the weight of a loading function, e.g. periodic function or sum of periodic functions, is determined at the position of the determined interferogram elements, e.g. when the numerical expression of the loading as a function of interferogram domain position are known.

In interferometry spectroscopy, such as Fourier Transform Spectroscopy it is common to use an apodization function, which in a qualitative manner can be explained as to some extent "soften" the effect of limited scan length, e.g. by reducing "spectral artefacts" introduced through the fourier transformation of an interferogram of limited size, such as fringes. On the other hand, since the effect of applying the apodization is to scale the values of the interferogram elements towards the end of the interferogram this obviously has the effect of suppressing significant information, in this case information towards the end of the interferogram. Although several embodiments of the present invention can be applied to interferograms which have been apodized in the manner of the state of the art of interference spectroscopy, it is generally preferred not to apply such methods to the interferogram. On the other hand it is often preferred to apply apodization to loading function, e.g. periodic function, preferably where the apodization function has the value of 1 except at end position of the interferogram where it has the value of 0, preferably where the zero region is adjusted to an end or start of a full or half cycle of a periodic function. The effect of such apodization is typically equivalent to applying a periodic function with a whole number of cycles, preferably where the length of the interferogram does not equal whole number of cycles of a periodic function. Thus it is preferred to apply substantially different apodization to each frequency determined periodic function, which can make the inner product of such function reflect variable weight of the interferogram but this is preferably compensated for, e.g. by determining the weight of an apodized function relative to a function without apodization. In many embodiments of the present function it is possible to obtain a result of spectral representation which is comparable to the method of apodization in interferometry spectroscopy, where this effect is obtained by treating individual product elements and/or product segments with predetermined weights.

The use of cosine or sine functions as periodic function is often preferred, e.g. under conditions where limited or no a priori information about spectral properties of the system under investigation is present. In other embodiments it is preferred to use other functions where the form of such functions is determined on the bases of the properties of the system under investigation. Such functions preferably have certain periodic properties as discussed above while other equally preferred functions have a more complicated property although the result of these functions, e.g. with regard to balance, preferably is present. Many embodiments of the present invention use a first function determined on the bases of the property of the system to construct or simulate a second function resembling properties of the first function but which consists of periodic functions, e.g. a sum of periodic frequency functions where the weight of different frequency functions is adjusted to at least partly represent the first function. One often preferred advantage of determining such second function is that it allows determination of numerical value of the function at any position in the interferogram domain and/or to adjust weights of individual periodic function, a property which is much preferred when a model is developed on one system, under certain conditions, and applied under different conditions or on a different instrument. These functions, as well as the periodic functions such as cosine or sine functions, can be termed loadings or loading functions, a term generally used in the field of chemometrics. This applies to functions both in the form where the function represents the entire interferogram and when only a section is considered, e.g. where the function has the value of zero outside a section of interest. One preferred embodiments for the determination of a loading, is to estimate a first loading, e.g. model loading such as principle component of PCA or latent variable of PLS calibration or other multivariable model, and then constructing a second loading by determining weights of one or several periodic functions, product elements or product segments, e.g. based on cosine or sine functions, which represent one or several features of the first loading, replacing the first loading with the second loading and continuing the determination of model loadings repeating the above until a satisfactory number of loadings has been determined, e.g. by using the techniques of chemometrics for the determination of significant number of factors or dimensionality of the model.

When spectral properties of the system under investigation are known, then loadings are preferably a weighted sum of periodic functions such as cosine or sine functions, preferably representing frequencies of substantial interest for the task at hand. For instance one preferred embodiment includes the construction of a loading which substantially represents an extinction or emission waveband property of a sample or a component, where such waveband properties often consists of two or more spectral features, e.g. two or more peaks, and then such properties can either be represented in two or more loadings or in a loading where more than one waveband property is represented. Often it is preferred to use calibration methods to determine the shape of loadings or which frequencies and/or interferogram sections are considered, preferably where a set of measurements has been obtained which reflect conditions which might affect the representation of spectral features in the interferogram. Such loadings are often preferred when there exists interference, e.g. of spectral nature or caused by physical or mechanical conditions of the system, where it can be difficult to determine the exact weighing of periodic functions. An often preferred embodiment is to use calibration model to assign weights to periodic functions, either throughout the entire interferogram or preferably one or more parts of the interferogram, and thus constructing loadings which retain many of the preferred properties of periodic function and combining it with the multivariate properties of calibration models.

In general when inverse fourier transformation or inner product of an unscaled or uniformly scaled periodic function using all interferogram elements represent the "pure" spectral property, e.g. emission or transmission at a specified frequency (assuming high resolution interferogram). On the other hand the use of individual interferogram elements, e.g. when a loading is a loading in a calibration model correlating interferogram information to a property, represents the weight of the property of interest in the modulated interferogram, e.g. without direct relation to frequency. These two approaches can be viewed as the "end points" in situation where a score is derived as a product of a loading function and the interferogram, using uniformly scaled periodic function reflects spectral feature and calibrated loading reflects the property. While both approaches are a feature of many preferred embodiments of the present invention, the use of individually weighted product elements and/or product segments is also preferred in many embodiments of the present invention. A qualitative effect of the use of product elements and/or product segments can be weighted combination of pure spectral property and property correlation at a specified frequency. Thus it is for instance preferred in several embodiments of the present invention to apply predetermined weight, e.g. weight different from 1, to one or several product element or product segment, preferably where the effect of the weight is zero or substantially zero and the effect suppress noise or other phenomena negatively affecting the quality of the determination of chemical or physical property, or where the weight is different from zero and effect of the weight enhances the quality of the determination of chemical or physical property. These weights are preferably determined on the bases of a priori information of spectral properties of the system under investigation, or more preferably weights are determined by multivariate calibration.

While many preferred embodiments of the present invention include score information for the determination of a chemical or physical property of a sample or a component in a sample, many equally preferred embodiments include a mathematical transformation of scores in the determination. One often preferred transformation is to normalise scores to scores obtained or determined under reference or stabile conditions, e.g. similar to the forming of a ratio between attenuation of sample blind and attenuation of sample in spectroscopy to obtain transmittance, preferably when the normalisation introduces substantial linearity between transformed scores and determined property, e.g. comparable to the calculation of absorbance by logarithmic transformation of transmittance in spectroscopy, or enhances reliability or stability of scores with respect to varying environmental or physical conditions of the sample or the system used. Typical and often preferred mathematical transformations are similar in form and effect to Beer-Lambert, Kubelka-Munk or transformations typically used in spectroscopy.

One often necessary feature of spectroscopy is the ability to reference or normalise the spectral information to properties of known or reference conditions, e.g. the determination of spectral properties of a sample blind under identical conditions when determining attenuation or emission spectrum, for instance for the purpose of transforming attenuation information into absorbance or removing or suppressing "spectral background". These spectral properties allow the determination of normalised spectral responses and are often essential in the comparison of spectral data or its use for model purposes. Many of the factors taken into consideration with such a normalisation of spectral data are highly correlated to frequency or wavelength, e.g. light source intensity or detector sensitivity. Even though this property can make it difficult to normalise collected interferogram, since it consist of substantially all frequencies at all points in the interferogram, this is made possible in many preferred embodiments of the present invention by applying such a normalisation to product element and/or product segments, or loadings where frequency dependency is known, often preferably for the purpose of normalising an interferogram, e.g. by decomposing an interferogram into frequency related information, e.g. periodic functions and/or other loadings, which can be normalised and then recombine such frequency related information into an interferogram. One preferred embodiment of such a normalisation is to determine the spectral property of the frequency corresponding to the periodic function and/or frequencies close to this frequency, e.g. by determining response by a full inner product or inverse fourier transformation, and then applying knowledge of the spectral property to normalise product elements and/or product segments corresponding to the frequency in question.

Similar and often preferred approach is to determine the presence of an interfering component and remove or suppressing its contribution in the measured interferogram or spectrum, for instance in IR spectroscopy the effect of the presence of naturally occurring water and carbon dioxide gas in ambient air can be variables which can not fully be controlled but its presence in the measured interferogram or spectrum can be eliminated or reduced substantially. This method is often preferred over the method of normalising through the measurement of a sample blind which would contain the same or similar interference.

Several embodiments of the present invention rely on the determination of reference conditions of the sample and/or optical, electrical or mechanical properties of the system used to obtain interference information, preferably where such information is used to normalise or standardise interferogram data or spectral properties. The general method is to obtain a response from the system under conditions where the component, or sample being investigated is substantially not represented, e.g. in analogy with the recording of a blind sample. This information is subsequently used for the determination of properties against which later measurement, preferably conducted under substantially identical conditions, reflecting the component or sample of interest, are related. In certain embodiments of the current invention it can be difficult to obtain measurement at representative reference conditions, for instance when the applications concerns in-line/at-line measurement where conditions such as sample blind are rarely or never obtained, when sample is analysed in a disposable sample compartment, where the conditions in the sample compartment are only maintained for one or few measurements, e.g. due to varying physical dimensions of different sample compartments, or when analysis are conducted at speed where measurements of reference conditions consumes substantial time, or where conditions of the measurement system change rapidly relative to analysis and/or sampling time. In such embodiments the measured result of the sample is used to estimate or predict reference conditions, preferably where a model has been developed by recording multiple reference conditions reflecting multiple conditions and correlating it to sample conditions, preferably by describing interferogram, product elements, product segments or spectral properties by a set of orthogonal or substantially orthogonal descriptive properties, for instance principle component or latent factors, and determining correlation of scores of the descriptive properties under reference conditions to interferogram, product elements, product segment or spectral properties of sample conditions, e.g. by developing a calibration model, and using the prediction of scores of the descriptive properties to reconstruct reference conditions which can be used to normalise sample data. In applications where it is difficult to obtain reference conditions it is often preferred to determine or estimate such conditions, preferably by identifying properties which are substantially not correlated to the property or properties to be determined, as well as correlated properties (e.g. not correlated property is orthogonal to correlated property), and then using the combinations of such uncorrelated and correlated properties and thus obtaining reference conditions, preferably when these properties are additive or substantially additive, e.g. when observed data is substantially equal to the properties of a system under reference conditions in addition to contribution reflecting property/properties being determined (e.g. correlated property) then reference conditions can be estimated as observed data less the contribution of correlated property. Such embodiments are often preferred when observed data relate to the attenuation of electromagnetic radiation and chemical or physical property being determined is substantially not linear in the attenuation, e.g. when Beer-Lambert, Kubelka-Munk or similar relations between property and observed data apply.

Other and often preferred embodiments involve compensating for spectral sensitivity of a system in use by determining a set of parameters such as weights, loadings or loading weights, characterising the property of the system in use and applying these parameters to the measured data or model data prior to analysis. One preferred embodiment is to determine the response of a system at a given frequency and subsequently scaling periodic function representing this frequency, or other frequencies, in a manner which allows the periodic function to be used in a predetermined model, e.g. a prediction model, which is created without prior knowledge of the specific frequency response of the instrument, often preferably such calibration models are based on measurements on a reference instrument, or on a standardised instruments representing a reference instrument. An often preferred property of such normalisation of frequency response is the improvement in the performance of a calibration model which is distributed among instruments, often preferably being substantially equal to standardisation of frequency response of instruments.

Several preferred embodiments of the current invention, concern evaluation and/or pre-treatment of interferogram data, or normalised interference data, suitable for several applications based on interferometry, including several other preferred embodiments of the present invention and/or the state of the art method of Fourier Transform Spectroscopy. Several factors can cause systematic changes to an interferogram, many of which are observed during the recording of an individual interferogram (where for instance an interferogram, e.g. a combined interferogram, is constructed on the bases of two or more individual interferograms), e.g. caused by chemical or physical changes of the sample or optical, mechanical or electrical changes of the measuring system, while other are observed during the measurement of a sample or from the measurement of one sample to another. Effect of many of these changes is an effect which can reduce the reliability or quality of a determination of a property of sample or component of a sample, for instance momentary mechanical or electrical disturbance of the interferometer during the recording of an individual interferogram, while other reflect the property of a sample, for instance a limited homogeneity of the sample or component representation in the sample compartment such as when measuring samples with variable or changing particle size or sample where the analyte or a physical component of a sample is not entirely filling the sample compartment, e.g. when measuring whole or coarsely grated corn or an emulsion of two phases. These effects are characterised by having an effect on the observed spectral properties of the sample as present in the measurement system, an effect which can be absent or represented in a different manner if the sample or another portion of the sample material is measured for a second time, often where such and effect is additive in the interferogram allowing the interferogram to be separated into two or more independent or substantially independent constituent, and/or where such effect is more like a multiplicative effect, e.g. when the spectral response in the interferogram at different frequencies is substantially different.

A typical preferred embodiment of the present invention involves the establishing of two or more, preferably orthogonal or substantially orthogonal, loadings, e.g. Principle Component loadings, either on the bases of two or more individual interferograms of the measurement of the same sample, and/or on the bases of two or more individual interferograms and/or combined interferograms of previous measurement of the same or different samples. Then these loadings and/or the scores of these loadings, and/or correlation or comparison to each other or a pre-determined property, and the result is used for; the determination of a quality and/or suitability of an individual interferogram or combined interferograms in the determination by a model, e.g. to determine if an individual interferogram should be included in a combined interferogram, and/or as a parameter of a model used for the determination, e.g. where two or more loading is treated as a two or more interferograms in the model, i.e. primary and secondary interferograms, and/or the determination of which of a selection of models is to be applied.

In state of the art methods of interferometry the combined interferogram is generally the mean of two or more individual interferograms, typically where the purpose of the combined interferogram is to improve the quality or reliability of the signal level of each interferogram element. While this is a much-preferred method in several embodiments of the present invention, other embodiments use other properties of a group of individual interferograms or combined interferogram. One preferred embodiments uses a loading and/or scores from a principle component analysis (PCA) of a group of individual interferograms and/or a group of combined interferograms, preferably where the interferograms are not altered before PCA, e.g. without the application of centring and/or scaling, often though preferably normalised. Several preferred methods of the current invention use a loading, such as the fist loading of PCA, to represent the general property of an interferogram, parallel to the use of combined interferogram constructed as a mean of individual interferograms, while in other embodiments it is used as a first representation of an interferogram, i.e. a primary interferogram, and preferably another loading, such as loading of PCA, is further included in a prediction as a second representation of interferogram properties of a sample, i.e. a secondary interferogram, where primary, secondary or in general any such representation of an interferogram are included, processed in a manner as would an interferogram. This is preferably in situations where two or more substantially independent effects are present, on occasion an effect is present in variable magnitude, where a secondary interferogram preferably represents an effect substantially not present in the primary interferogram, typical examples of such effects are the change in chemical composition, alteration of phase, e.g. the formation of air bobble, variable size distribution or movement of particles or the like during measurement. Several of such embodiments use loadings, such as PCA loadings, which are determined from the group of individual interferograms of the sample being analysed while other embodiments instead or in addition use one or more loadings which are pre-determined in analysis of individual or combined interferograms of the measurement of other samples and/or measurements representing different conditions, e.g. sample or instrument conditions.

Where data, e.g. scores, are usually included in a model for prediction, it is often preferred to use properties derived from a set of scores from individual interferogram of a sample, preferably when measuring system showing where properties vary during measurement. Such properties are often the moment (in statistical sense) of data, such as range, standard deviation or variance. Further such properties of different scores, e.g. covariance or correlation are often preferred to be as an input in a predictive model.

Often, and preferably when a priori knowledge exists concerning the presence or magnitude of an effect, e.g. if a system evolves in time or if identity of instrument, operator or another factor which might influence the measured interferogram changes, it is preferred to apply the method of Orthogonal Signal Correction, or a similar method, where correlation of such an effect is isolated or removed, preferably where the influence of the effect is included as scores or in the determination of a later loading or a secondary interferogram. The advantage of this is the substantial isolation or removal of such factors, preferably where the effect is included in a loading, score or a secondary interferogram and thus included in a model, since this can be valuable in diagnostics of results and even can improve the quality and/or reliability of a determination.

One much preferred embodiment of the present invention, concerning establishing a method for determination, e.g. establishing a predictive model through calibration, involves the measurement of interferogram elements of a suitable number of samples in a suitable number of replications reflecting chemical and/or spectroscopic variations, preferably under conditions involving adequate signal representation, by suitable amplification and digitisation using resolution of 16, preferably more than 16 such as 18, 20, 22 or 24 bits, determining interferogram, such as combined interferogram, or primary and secondary interferogram(s), construction of product elements and product segments for a selection of frequencies, for instance frequencies at predetermined intervals and/or frequencies considered relevant from prior knowledge concerning the sample, preferably normalising interferogram, product element or product segment data, obtaining or determining information about spectral feature and/or chemical or physical property for each of the samples analysed and using any suitable calibration methods, such as state of the art methods of PLS, PCA/PRC, ANN, PARAFAC, Tucker3, to determine weighing and/or significance of individual production elements and production sections relative to the model performance, e.g. by using methods of cross validation, test set validation or jack knife validation, preferably where individual product elements and/or product segment are combined into new product segment in model generation in an iterative manner. The model produced is then used for the determination of chemical or physical property of a sample or a component of a sample and preferably a number of models are generated for each set of measured interferograms allowing the determination of more than one properties on the bases of same data, such as spectral properties, e.g. attenuation, absorption or emission spectrum, chemical composition or properties such as pH, or physical property such as temperature, homogeneity, viscosity or particle size.

Furthermore, according to arguments presented above it is preferred that the applied loading functions are balanced. As this it not necessarily obtained by loading functions obtained using the above mentioned calibration models it is preferable that these loadings are decomposed into sub functions which are substantially balanced.

From the above it is apparent that several embodiments of the present invention concern the extraction of information from an interferogram for the purpose of determining property of a sample or a component of a sample by. The art of spectroscopy relies on several methods which resembles a pre-treatment of an interferogram before using it for spectroscopic analysis, for instance low and/or high pass filtration. Even though many preferred embodiments of the present invention are applied directly to the measured interferogram, these can equally well be applied to an interferogram which has been pre-treated. The methods of prior art offer several applications which can be used to reduce or substantially eliminate interfering information in interferogram elements, e.g. by including such interference in the data and relying on multivariate calibration methods for the elimination of such interference, or further when the interferogram is conditioned, e.g. by digital filtration of collected data to isolate spectral information of substantially univariate nature, relative to the property of interest (e.g. Small et al, U.S. Pat. No. 6,061,582), before including interferogram data in a multivariate calibration. Several preferred embodiments of the present invention use scaled interferogram data, e.g. scaled by forming a product of interferogram elements and function elements, e.g. single or multiple periodic function(s) or other predetermined loading functions.

The concept of univariate systems is often encountered in studies of properties under laboratory conditions. In application involving natural systems or samples, on the other hand, univariate conditions are not frequently encountered, rather these system are typically of a multivariate nature, with respect to correlation between spectral properties and the chemical or physical property or parameter of interest. This makes it essential to establish conditions, where it is possible to resolve the correlations that might be preset. One approach, typically not preferred in the present invention, is to establish conditions where univariate property can be observed, such as by filtering interfering spectral properties. An often encountered consequence of such an approach is the loss of awareness of unforeseen conditions. Therefore it is typically preferred to establish conditions that allow the construction of a multivariate model, capable of processing covariance in the measured data. One preferred method is to construct or determine loading functions, which represent orthogonal or near orthogonal sub-space of the measured data, with higher dimensionality than 1 (dimensionality of 1 corresponding to a univariate system). Such loadings are constructed using multivariate models including interferogram elements, but generally it is preferred to perform transformation of interferogram elements by the determination of a score of an a priori determined first loading function, and to use such scores as input to a multivariate model. Even though such first loading functions often produce near colinear scores, the model based on these scores arranges them into substantially orthogonal representation of the system under consideration, e.g. by the determination of model loadings, e.g. second loadings. The number of such first loadings is therefore typically equal in number to the second loadings, but preferably there are more, even considerably more first loadings, than are second loadings. The number and nature of any such first loadings is preferably determined in consideration of improved predictive performance in the determination of a chemical and/or physical property of a sample, or a component of a sample, such predictive performance typically being accuracy or precision of the determination.

Embodiments of the present invention are preferably applied in virtually all disciplines of interference spectroscopy, such as attenuation, transmission and emission spectroscopy in several spectral regions and implementations such as X-Ray, UV/Vis, Near-IR, Mid-IR, Far-IR, microwave and radio frequency. Further it is equally well suited for techniques such as luminescence, e.g. fluorescence, phosphoresce and chemiluminescence, NMR, ESR, Raman, PAS, ATR, DR and in general techniques where data is modulated, for instance where frequency is represented in time, space or distance domain.

The application of embodiments of the present invention includes traditional application such as analysis of samples on liquid, solid or gas phase, but it is equally well suited for other spectral analysis such as investigation of radiation in astronomy. The general property of many of the preferred embodiments is the reduction in the size of data typically needed and/or reduction of the domain span of the measured interferogram, for instance in high resolution spectroscopy, e.g. qualitative and quantitative gas analysis. Further embodiments of the present invention are very well suited for spectral analysis of images, where its application typically allows such analysis to be performed under conditions which substantially reduce the amount of data which has to be recorded.

A typical benefit of the application of embodiments of the present invention are firstly enhancement or extension of spectral analysis and secondly reduction in the complexity of instruments based on such embodiments compared to state of the art instruments based on interferometry. Several embodiments of the present invention demand computational resource that exceeds those of the state of the art methods, but current state and future development in computers and computation allow for suitably efficient implantation of these embodiments.

A typical property of several of the preferred embodiments is the determination of gas property using mid-IR interferometry with short OPD, short compared to the relatively high spectral resolution traditionally demanded by the sharpness of many typical spectral features of gas, e.g. water gas. Under these conditions it is often preferred to use several embodiments, such as scores of loadings to determine relative or absolute concentration of gas in a sample, for instance by adapting one or several loading functions to, substantially or in part, represent the spectral properties of the gas and using scores, rather than a high resolution spectrum, to obtain determination of adequate quality. A typical loading, substantially representing spectral property, is a loading from a PCA or PLS model of the system, while loading representing spectral properties in part could be one or more periodic functions, for instance representing one or several of the spectral features, e.g. absorption band(s). Many such embodiments further allow satisfactory determination of properties of samples consisting of more than one species of gas.

One much preferred embodiment of the present invention concerns the determination of physiological condition or property of a biological system or organism. These embodiments include invasive and/or non-invasive measurements of components of tissue or bodily fluids. Preferred properties determined using embodiments of the present invention include determination of amount or presence of one or more chemical components, such as glucose, oxygen, proteins, lipids, cholesterols, alcohol, as well as determination of general properties such as presence or pre-conditions of illness, controlling of dosage of medicine, e.g. insulin admission, or the process of treatment, e.g. conditions under surgery or dialysis. The determination of such general properties are often related to properties of one or more chemical components, e.g. the level of glucose as an indicator of diabetes, while others are preferably determined by one or more general spectral feature of the system and often such features can not easily by contributed or diagnosed as being contributed to one or more chemical component, rather is can be looked at as the net result of the property of the biological system, e.g. an "abstract" spectroscopic representation of an illness or condition.

One property of several preferred embodiments of the present invention is the possibility to construct small and compact interferometry instruments based on one or several embodiments of the present invention. Preferably such small and compact instruments are applied to the analysis of biological systems, e.g. human individuals, where it is particularly suitable for de-centralised investigations, such as investigations carried out as point-of-care investigation, in doctor office, in the field, or even in patient home. Preferably such instruments report results directly, but it is often preferred to further transmit results or measured data to a central processing station for registration or evaluation.

The application of several preferred embodiments of the present invention allow or improve the use of near-IR and in particular mid-IR spectral techniques in the investigation of aqueous systems, such as biological systems, which commonly comprise water at substantial levels, typically around 70%. This often constitutes a problem in the IR spectral region since water is a strong absorber of such energies often making it difficult to measure such samples, e.g. due to limited sample thickness in transmission or mission spectroscopy. Since several embodiments use short-scan interferograms this allows the construction of instruments with properties normally not obtainable when considering high-resolution interferometry techniques, one often preferred property is the construction of instruments with relatively large numerical aperture, conditions which normally cause self-apodization in state of the art instruments. It is often preferred to use such numerical aperture which do not cause self-apodization in the interferogram, but it is equally preferred to use conditions where such self-apodization occurs using many of the preferred embodiments of the present invention, including embodiments for the elimination or compensation of this effect, thus making it possible to perform accurate and reliable determination of chemical or physical property of a sample, e.g. biological system.

Further embodiments of the present invention apply equally well to applications not normally associated with spectroscopic analysis but where applications can offer the benefit of spectral investigation. One example is an application in the field of surveillance, e.g. where measurement of heat radiation or reflectance are applied, for instance for the detection of movement or for the detection of heat, e.g. as an early warning of fire. Embodiments which are implemented in small and compact sensors can offer additional information as well as improving sensitivity and selectivity of such devices, for instance by offering simultaneous determination of heat and various gases in the detection of fire, presumably improving sensitivity as well as giving additional information such as the nature and state of fire.

From the above it is evident that embodiments of the present invention are well suited for implementation in a system, preferably comprising at least sample compartment, interferometer means, data acquisition means, data processing means adapted to include methods of the present invention and output means capable of transmitting results of determination of a chemical or physical property of a sample or component of a sample. Such systems offer considerably advantage compared to state of the art systems used for similar application, mainly due to smaller size and greater robustness against physical strain such as vibration. Systems according to the present invention are particularly well suited for spectroscopic applications in the infrared region, and in particular in the mid-infrared region. This is in particular due to the reduced size of an interferogram, defined as the length of scan, e.g. OPD, where applications of the current state of the art require OPD of 1 mm or more, while embodiments of the present invention are well suited for smaller interferograms, such as smaller than 1 mm, preferably smaller than 0.5 mm.

Solid-State actuators, e.g. actuators, for instance piezo elements, where displacement is achieved through deformation, such as stretching, crimping or bending of the actuator, have currently found use in interference spectroscopy in the UV and visible range, where OPD of less than 0.1 mm, such as 50 μm or less, are typically adequate for obtaining suitable spectral resolution. Since several embodiments enable spectroscopic analysis using short interferograms it is highly preferred to apply these methods in a solid-state interferometer, in particular when OPD is 1 mm or less, and preferably in infrared spectroscopy.

DESCRIPTION OF THE INVENTION

Figure 1:
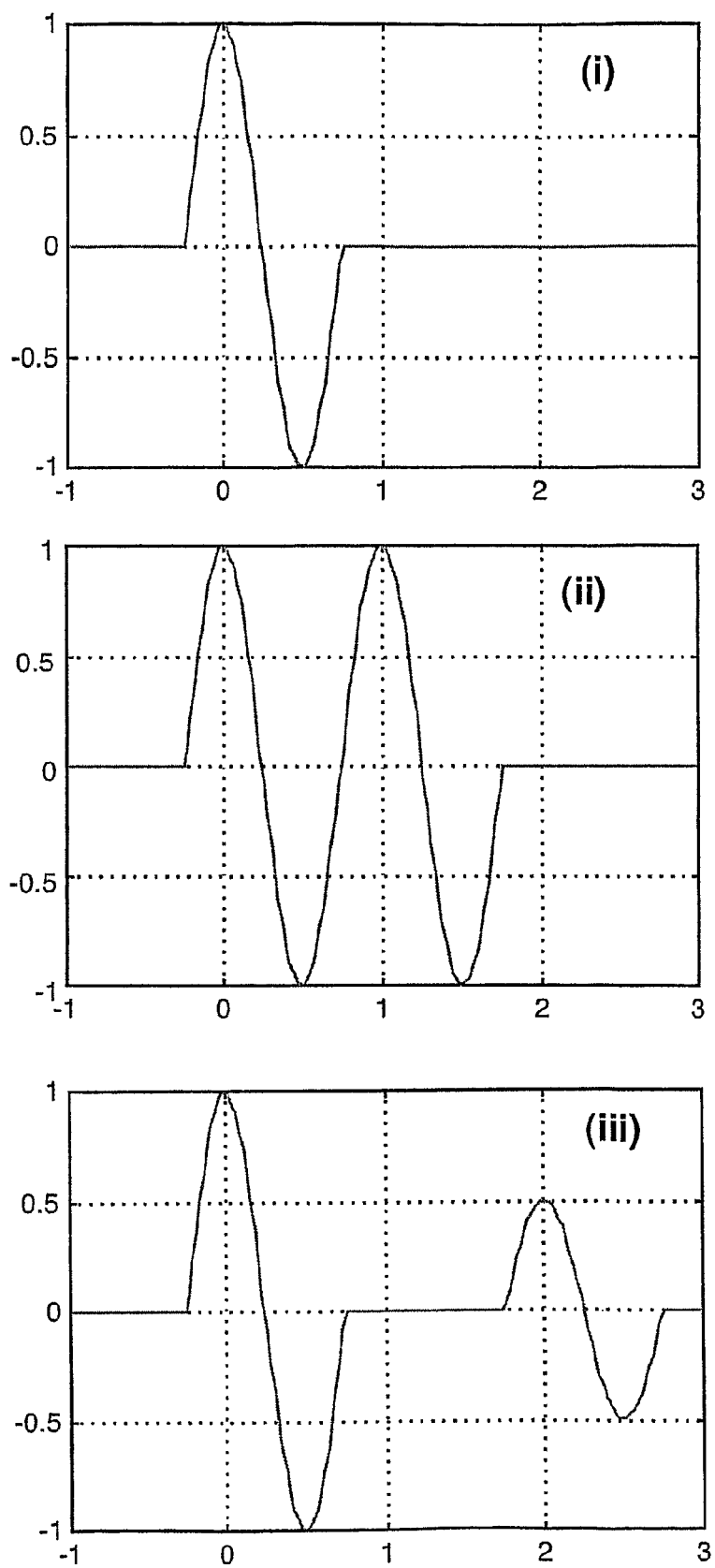
FIG. 1 Examples of simple balanced functions.

Preferred methods of the current invention relate to the determination of a chemical or physical property of a sample, using spectroscopic methods based on interferometry, e.g. based on obtaining an interferogram. Preferably the interferogram is obtained under conditions where the interferogram represents interference in the modulated domain, where the interferogram comprises two or more digitised interference data points representing substantially different status of modulation, preferably where the interferogram comprises three or more digitised interference data points representing status of modulation at equal representation in interferogram domain, e.g. spacing of time, frequency, position or distance. Here it should be noted that the term digitised interference data point is used interchangeably with the term interferogram element. Preferably the spacing of interferogram elements is chosen depending on the spectral region under investigation, such that the highest frequency of the spectral region is represented by at least 1 interferogram element per cycle, preferably more than 1, such as 2, 4, 8, 16, 32, 64 or 128 interferogram elements per cycle. Typically the purpose of such small spacing is to allow determination of interferogram with higher domain resolution, preferably where this enhances quality of the determination. When considering the infrared spectral region, typically concerning frequencies in the range from about 600 to 10,000 $cm^{-1}$, it is generally preferred to obtain interferogram elements representing optical path difference (OPD) of about 2 μm, preferably less than 2 μm such as approximately 1.0, 0.8, 0.5, 0.2, 0.1, 0.05 or even less than 0.05 μm.

Further several preferred embodiments of the present invention include interferogram elements that are obtained at uneven spacing in the interferogram domain. In such embodiments it is preferred to obtain interferogram with variable domain resolution, in some sections of the interferogram, preferably where the resolution is high in sections which reflect information that represent a feature in the interferogram. Such sections are typically regions where modulation causes substantial changes in the modulated intensities as a function of domain, such as at or close to centre burst in an interferogram from a Michelson interferometer. Typically such unequal spacing of interferogram elements is obtained by varying one or both of the rate of modulation, or the rate of data collection during the measurement of the interferogram. Rate of data collection is defined as the inverse to the time span between successive accusations of data. Rate of modulation can not always be altered, but for instance in a Michelson interferometer the linear velocity of a moving mirror defines the rate of modulation, e.g. changes OPD per time.

When considering the IR spectral region, i.e. near-IR, mid-IR or far-IR, several preferred embodiments of the present invention concern modulation of light by changing optical path difference (OPD) between different fraction of the light, e.g. as when modulated by a Michelson interferometer. In several of these embodiments it is preferred that the maximum OPD is no longer than 1.0 cm, preferably where it is shorter than 0.8, 0.6, 0.5, 0.4, 0.3, 0.2 or even shorter than 0.1 cm. In other equally preferred embodiments the OPD is shorter than 0.08 cm, such as shorter than 0.07, 0.06, 0.05, 0.04, 0.03, 0.02 or even shorter than 0.01 cm.

In several embodiments it is preferred that an interferogram is symmetric or substantially symmetric in the position of interferogram elements around centre burst, preferably where the extent of negative and positive OPD are substantially equal. These embodiments are typically characterised by taking advantage of the symmetric property of the modulated information. In other equally preferred embodiments it is preferred that the interferogram is asymmetric, preferably where the position of a centre burst is approximately at a position 45, 30, 20, 10, 5, 2 or 1 percent of the length of the interferogram, i.e. where the length of the interferogram is defined as span of interferogram domain represented, as determined from either end of the interferogram. Preferably the position of the centre burst is close to either end of the interferogram, such as at or closer than 20, 15, 10, 5, 2 or 1 percent of the length of the interferogram.

Some embodiments of the present invention, also when considering interferograms representing short OPD, involve the application of Fourier Transformation, e.g. inverse fast fourier transformation (FFT), for instance for the purpose of determining spectral properties such as absorption, transmission or emission properties, preferably in combination with other information derived from the interferogram. To compensate for limited spectral resolution as a consequence of short OPD the FFT is preferably performed using the method of zero-filling, thus obtaining representation of spectral data by interpolation, and/or preferably by determining such intermediate information using information from the interferogram, such as by using scores of periodic functions or other loading functions.

One often preferred embodiment of the present invention is to form a value (e.i. score) by forming a product between interferogram and a loading function, and if more than two products are formed then the value is the sum of these products. Preferred loading functions for inner product can have various properties, such as being periodic functions, e.g. cosine or sine functions representing predetermined frequency, or a function which sum is substantially zero, e.g. balanced functions, at least over a section. Several other equally preferred loading functions are determined by using knowledge of the system being analysed, such as by forming a model of the system and deriving function information from such model. Such functions can be sum of periodic functions, preferably of variable weight and/or other loading function such as Principle Component and/or Partial Least Squares loadings. When loading function is periodic function or balanced function, several embodiments prefer to obtain individual scores for a section representing substantially a full cycle of a periodic function or a section where the sum of the balanced function is zero. The beginning and end of such full cycle is often preferably chosen such that the value of the function is substantially zero at these points, since this often results in a better "stability" than can be observed for arbitrary beginning and end point, e.g. where "stability" is the resistance to the change in score as the beginning and end points are varied slightly, such as representing the shift of one or few interferogram elements. Several preferred embodiments using section of the interferogram to form a score, e.g. a product segment, use more than one section of the interferogram, for instance when each score represents a cycle or balanced section, use more than one such score value, for instance representing score of a loading function of different interferogram sections and/or the score of different periodic functions, representing one or more frequencies. In many preferred embodiments such sections are consecutive, while in other equally preferred embodiments such sections are placed apart in the interferogram domain.

In a preferred embodiment of the invention, the individual interferogram elements are used as at least part of the basis on which analysis is performed. For the purpose of obtained such interferogram elements it is obviously strictly only necessary to measure the relevant interferogram element rather than the entire interferogram. However, in mathematical context this is equivalent to using a delta function (e.i. a function having a value of 0 at all positions except one position, where value is different from 0) in the transformation to extract the said interferogram element from the interferogram or segment thereof. Depending on the calculation method embodiments of the present invention prefer either a Dirac or Kronecker delta functions.

Qualitatively the score of a loading, being single periodic function representing a frequency, and the full interferogram resembles the result of an FFT for that particular frequency. Several embodiments prefer such loading score, since this can substantially determine corresponding spectral property of any frequency, where the frequencies determined by FFT methods are determined by which conditions the interferogram is obtained, e.g. element position and spacing. Further preferably such loading functions do not form a product with all interferogram elements, but preferably only elements found, or determined to give improved quality. One preferred embodiment is to only include such section of an interferogram as substantially integer number of whole cycles of the periodic function are represented. In some preferred embodiments of the present invention the different cycles of a periodic function are weighted equally, while other equally preferred embodiments apply different weights to at least some of the cycles.

Under ideal condition determination of spectral property such as modulation of electromagnetic signal, is independent of physical and electrical properties of the system in use, while in practice this can be difficult to obtain, due to imperfect and instable properties of most of the components used in the construction of the system. Several embodiments of the present invention rely on substantial stable conditions and while many stability aspects are preferably addressed through construction, several are preferably addressed by embodiments of the present invention, A typical variable property is signal sensitivity, which can vary due to several factors, but where the net effect is intensity difference in observed signal, from one time to another or from one system to another. If the difference in sensitivity is the same for all frequencies, it can be compensated for by applying a scaling variable to each interferogram element, while this is seldom the case since variations in sensitivity are typically frequency dependent. Under such conditions it is preferred in several embodiments that such scaling has different value, such value being determined on the bases of frequency component of loadings, e.g. fundamental frequency of periodic functions. Preferably the property of such scaling is either to improve predictive property of a model with respect to variations in instrument related properties, or with respect to instrument related properties of different instruments.

Other properties affecting spectroscopic measurement are variable spectral interferences, such as the presence of water and/or carbon dioxide gas in IR spectroscopy. Typical spectroscopy applications rely on the measurement taken at known conditions in order to compensate for varying conditions, e.g. by the measurement of a sample blind. Several embodiments of the present invention include such approach, where the purpose is to determine substantially the sensitivity of each frequency and to use this information to scale loadings and/or scores in a predetermined manner.

While in many preferred embodiments it is preferred to measure spectral properties of sample blind, others equally preferred embodiments of the present invention determine the effect variable conditions from the measurement of the sample to be determined. Embodiments of the present invention use a priori determination of properties of variable condition to determine its presence and/or effect in the obtained interferogram and use this determination to compensate for and/or remove the variable condition.

Several preferred embodiments of the present invention include the application of linear model of the determination of a chemical or physical property of a sample or a component of a sample. Often, and preferably when correlation of the property being determined and spectral information is not linear, interferogram elements and/or model parameters are transformed in order to establish linear or substantially linear correlation, while in several other and equally preferred embodiments it is preferred to compensate for lack of linear correlation by relying on the inherent properties of the method used to generate determination model, e.g. PCA, PLS or ANN calibration models.

When making prediction models, e.g. a calibration model, it is often possible to include many variable effects, e.g. temperature, pressure, spectral sensitivity and/or position of interferogram elements in the interference domain, which have influence on the measured data, e.g. interferogram, and training the model to ignore or compensate for such influence. On the other hand, several of these effects can be difficult to realise during the measurement of the calibration samples or suppression of its influence can severely compromise the determination properties of the model and therefore several preferred embodiments of the present invention include transformations of measured interferogram data which substantially transform measured interferogram on a give instrument in such a way that it represent an interferogram as it would be measured on the instrument or instruments used in the making of the prediction model. One preferred effect of such transformation is that statistical quality of a determination on any instrument is comparable to that of the instrument or instruments used in the determination of the model, such statistical quality being expressed as the accuracy and/or the precision of the prediction. Often it is preferred that the property of the transformation is determined on the bases of the status of an instrument, e.g. spectral response and/or properties of means used for the controlling of data acquisition such as light source of known properties, relative to such status of instrument or instruments used in the developing of the model. In several embodiments of the present invention the transformation of measured interferogram is done with reference to properties of a measured interferogram, such as the interferogram being measured and/or one or more interferogram(s) previously measured by the instrument, often preferably where such interferogram is measured under reference conditions, e.g. measurement of sample blind.

In applications where one or more factors having influence on the generation and/or determination of interference data are substantially different during the measurement of a sample by any given instrument at any given time compared to conditions under which measurement of data used in the determination of a model, e.g. a calibration model, several preferred embodiments of the present invention include methods for the transformation of model properties, such as loadings, in such a manner that statistical quality of a determination derived from such a model is comparable to the statistical quality of the determination made during calibration and/or such determination carried out on instrument used for the generation of data for calibration or any substantially identical instrument, such statistical quality being expressed as the accuracy and/or the precision of the prediction. Often the application of a transformation is preferably controlled, or determined, by one or more properties of the instrument in question, e.g. spectral sensitivity and/or position of interferogram elements in the interference domain, preferably by relating such property to the same property of instrument or instruments used for the model generation. In several embodiments of the present invention the transformation of model properties is done with reference to properties of a measured interferogram, such as the interferogram being measured and/or one or more interferogram(s) previously measured by the instrument, often preferably where such interferogram is measured under reference conditions, e.g. measurement of sample blind.

A method according to any of the preceding claims, where a model for determination is developed on a first instrument, preferably by calibration including known properties of samples relating to chemical or physical property of the sample or a component of the sample and one, preferably several measurement of these samples, preferably where the properties of the model allow it to be applied to measurements on a second instrument, substantially without any a priori knowledge of the status of the second instrument, more preferably by including a priori knowledge of the status of the second instrument.

Several much preferred embodiments of the present invention use method of multivariate calibration for the generation of a model allowing the determination of chemical or physical properties of a sample or sample compartment by determining correlation between interferogram and the property in question. Such preferred multivariate methods include PLS, PCA, LS, ANN, PARAFAC, Tucker3.

Embodiments of the present invention are well suited for the determination of properties of several different types of samples, including: Aqueous sample, such as environmental sample, drinking water, bathing water, process water, cooling water; Biological sample, such as tissue sample, blood sample, urine sample, faeces sample, cell culture sample, bacteria culture, yeast culture; Industrial sample such as oil sample, petroleum sample, grease sample, pharmaceutical sample; Food sample such as milk sample, dairy product sample, meat sample, fish sample, fruit sample, vegetable sample; Gaseous sample such as exhaust gas, fermentation gas, combustible gas.

Further, different properties of analytes are suitable to determine with embodiments of the present invention, including; spectral property, temperature, turbidity, total organic material, dry material, dissolved material, chlorophyll, fibres, amino acids, proteins, fat, fatty acids, lipids, glyserids, cholesterol, enzymes, sugars, glucose, alcohols, ethanol, methanol, acids, citric acid, acidic acid, aliphats, aromats, ketones, aldehydes, pH, density, salinity, colour.

Embodiments of the present invention are successfully applied to analysis involving electromagnetic signal in different spectral regions, such as; X-Ray, UV/Vis, Near-IR, Mid-IR, Far-IR, microwave, radio frequency.

Further spectroscopic techniques such as absorption, transmission, reflection, emission are well suited for embodiments of the present invention, for instance when the detection involves sensing of phenomena such as photons, magnetism, heat or pressure, resulting in the application of a spectral method.

Properties of several different groups of samples can be determined with embodiments of the present invention including a food or feed sample, preferably where the food or feed sample is one or several of the following, fruit juice, milk, milk product, grain, cereals, beverages sample, preferably where the beverages sample is one or several of the following, juice, soft drink, beer, wine, spirits, pharmaceutical sample, preferably where the pharmaceutical sample is one or several of the following, raw material used in the production of pharmaceutical product, intermediate product in the production of pharmaceutical product, pharmaceutical product or other industrial products such as chemical products. Further including determination of property of a biological sample, preferably where the biological sample is one or several of the following, tissue sample, blood sample, urine sample, feces sample, preferably where the sample is of human or veterinary origin, or an environmental sample, preferably where the n environmental sample is one or several of the following, soil, aqueous liquid, gas. In still other applications relating to surveillance or security, embodiments of the present invention are much preferred, such as in the detection of pre-stages to a fire, such as elevated heat or release of gas, fire by direct determination of heat or hot spots, chemical spillage, e.g. involving volatile chemicals, water spillage or steam, or even the presence or absence of heat emitting subjects such as human or animals, where the spectral resolution offers several advantages over conventional methods. These embodiments are preferably applied where the interferogram is obtained as a result of passive remote sensing.

Typical applications according to the current invention are the determination of attenuation of light, preferably attenuation caused by absorption or scattering of light, or where the acquired information concerns the vibration or pressure of gas or air, substantially caused by absorption of light (photo acoustic spectrometry), or light which is reflected from a sample or specimen (reflectance spectrometry, diffuse reflectance spectrometry). Further applications where light which is emitted from a sample or specimen, where said emitted light is caused by absorption of light of substantially higher energy (photoluminescence spectroscopy), preferably where the emitted light is fluorescent light (fluorescence spectrometry), where light which is emitted from a sample or specimen, where said emitted light is caused by interaction of light of substantially the same energy (e.g. raman spectrometry), preferably where the interacting light reflects positive or negative Stoke-shifts, or where light which is emitted from a sample or specimen, where said emitted light is emitted light, preferably thermal emission (emission spectrometry) or even concerning light which is generated in a sample or specimen through a chemical process (chemiluminescence spectrometry), preferably where the chemical process involves an enzyme and a substrate. Also the method of Attenuated Total Reflectance (ATR) is preferred in many embodiments. Several embodiments of the present invention have application in spectroscopic methods, based on properties other than light, such as Nuclear Magnetic Resonance (NMR) or Electron Spin Resonance (ESR).

Example 1

Balanced Functions

In several embodiments of the present invention it is preferred to use one or more balanced loading function, where the term "balanced" refers to the property that the sum of the loading function is equal to zero. This property is for instance preferred, when it is of interest to suppress or minimise influence of interferogram features, such as bias or slowly varying "background" or high "frequency" noise.

FIG. 1 represents a few simple balanced functions. The horizontal (x-) axis on the graphs represents a number of $2\pi$-periods (e.g. OPD times wavenumber in a Michelson interferometer, or time times frequency in NMR-FID), and the vertical (y-) axis represents weights (arbitrary). In FIG. 1 the functions are illustrated around zero, but these function can be evaluated at any place in the interferogram.

The number of balanced function is unlimited but often, simple functions such as cosine and/or a sine functions, extended over one or a number of $2\pi$-periods, are preferred. FIG. 1 graphs (i) through (iii) illustrate such functions based on the cosine function. Graph (i) of FIG. 1 shows a cosine function extending a single $2\pi$-period, but outside the period the function has the value of 0. Graph (ii) shows a cosine function extending two $2\pi$-periods. Graph (iii) shows a cosine function consisting of two $2\pi$-periods separated by a single period, and where the weight of the second period is reduced relative to the first period.

Other functions, slightly more sophisticated than cosine or sine functions, often preferred in embodiments of the present invention are present in FIG. 1 graphs (iv) through (vi). The main apparent difference between these functions, and simple cosine or sine functions is that they are symmetrical around the centre of the function. Outside the boundary of the functions, as explained in the following, the functions take the value of 0. Graph (iv) of FIG. 1 shows a function which extends 4 $2\pi$-periods and the equation for this function is the product of two cosine functions; $f(x)=\cos(2\pi x)*\cos^2(\frac{1}{4}\pi x)$. The function in graph (v) extends 2 $2\pi$-periods is also a product of two cosine functions; $f(x)=\cos(2\pi x)*\cos^2(\frac{1}{2}\pi x)$. Finally the function in graph (vi), which extends 1 and a half $2\pi$-period has the form; $f(x)=\cos(2\pi x)*\cos(\frac{2}{3}\pi x)$.

Conclusion

Several preferred embodiments of the present invention include the use of balanced loading functions. Often score obtained from calculating the product sum, e.g. inner product, of "simple" function as the functions presented above, e.g. functions shorter than 1, 2 or typically just few $2\pi$-periods, but it is often preferred to construct a more extensive functions, e.g. on the bases of "simple" loading functions, such that these combined function retain the balanced property and use the scores obtained from these functions in prediction models. Typically the preferred number of loading functions is greater than one, and typically equal or greater than the number of independent parameters or parameter variations present in the system under consideration. The number and form of loading functions is preferably determined in such a way that it optimises the accuracy and/or precision of the prediction of the model used.

Example 2

Product Segment "Covariance"

Product segments according to present invention extend over a section of the interferogram. Theoretically, it requires an interferogram of indefinite length in order to derive frequency information at a given frequency, without having some frequency "abnormality", e.g deviation from "pure" frequency information. In spectroscopy, where interferogram are considerably large, these abnormalities can be seen as band-broadening or some cases fringes close to sharp spectral feature. It should be noted that the term "abnormality" in the current context refers to observed property, e.g. when obtained by calculation, rather than spectral property.

In chemometric sense, such spectral abnormality can be viewed as covariance between observed frequencies, such that change in intensity at frequency causes observed change at another frequency. In the present context the term "covariance" refer to some correlated effect of calculation, e.g. between frequencies, rather than the statistical term. A spectral abnormality is for instance observed at low resolution, where overlapping spectral information is observed. Several preferred embodiment of the present invention include the use of a short segment of the interferogram, as a source of data for a model. Therefore, in the same way spectral abnormality can be expected, then it is expected that similarly covariance will be present.

Figure 2A:
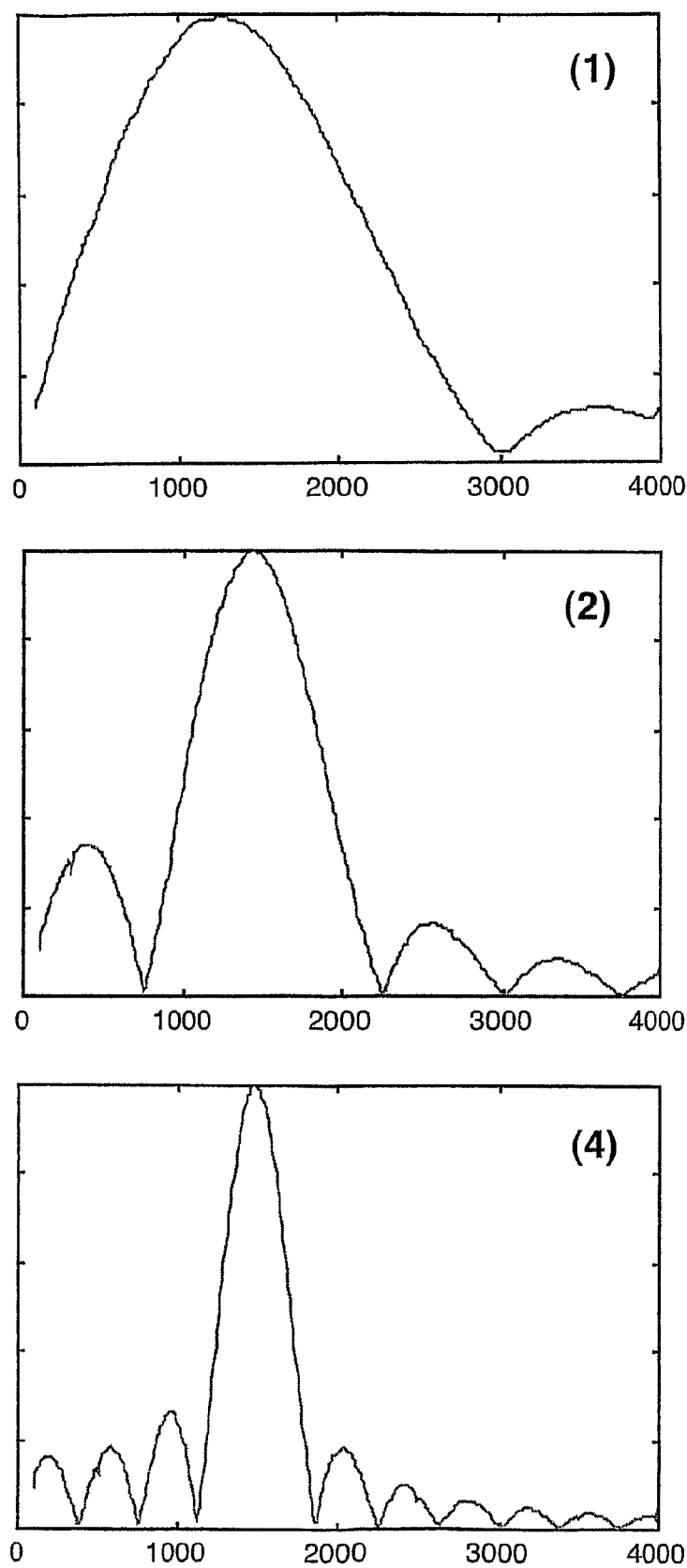
FIG. 2a Illustration of covariance expected in the use of segments of cosine periodic function as loading functions.
Figure 2B:
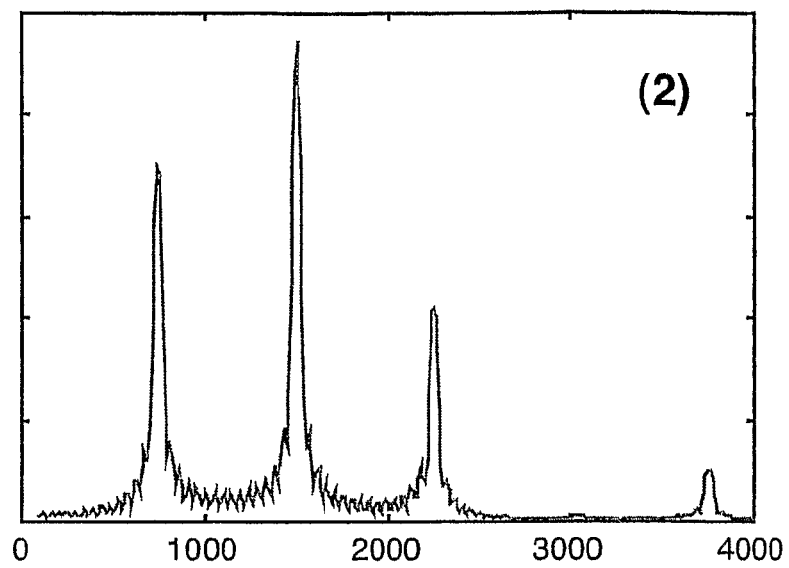
FIG. 2b Illustration of covariance expected in the use of segments of cosine periodic function as loading functions, wherein each loading function comprises two or more segments.
Figure 2B:
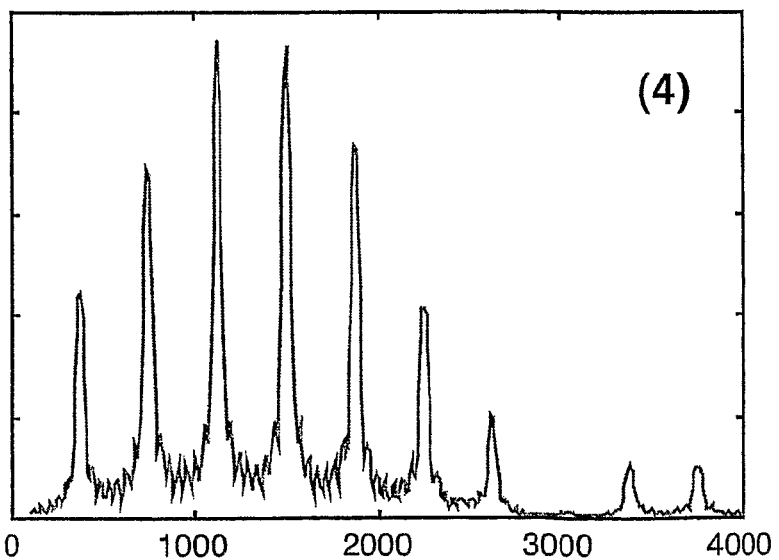

A simple segment loading as the cosine can have many different properties. Properties such as its fundamental frequency, position in the interferogram, length (e.g. in the number $2\pi$ periods) and weighing are expected to have affect. To illustrate this FIGS. 2a and 2b give a representation of covariance expected in the use of cosine periodic function as loading, e.g. a product segment. In the following we will consider a cosine function, corresponding to the frequency of 1,500 cm$^{-1}$ (wavenumbers). The effect of other frequencies, e.g. covariance, in the range 1,000 to 4,000 cm$^{-1}$, on the score of cosine periodic function is considered.

Since the observed effect will depend on the position of the cosine periodic function, the results in the current example represent the maximum observed effect of the frequencies considered on the periodic function as it is placed at several given positions in the interferogram. The positions considered are positions where the cosine function at the base frequency has the value of zero (positions on the interferogram corresponding to $\pi(n-1/2)$, where n is an integer). This is chosen in order to reduce any "border effects", mainly caused by the finite nature of the interferogram, where values at the border are weighed low.

FIG. 2a shows a qualitative measure of covariance between a cosine periodic function of a length 1, 2, 4, 8, 16 and 32 $2\pi$-period(s). The horizontal (x-) axis represent frequency (Wavenumber) and the vertical (y-) axis represent covariance (arbitrary units). The legend on the graphs (n) indicates the length of the cosine function in the number of $2\pi$-period(s). Each graph illustrates the maximum effect (e.g. covariance) the corresponding frequency has on a cosine periodic function at frequency 1,500 cm$^{-1}$.

Considering the different length of a cosine function, ranging from 1 to 32 $2\pi$-periods, FIG. 2a shows that a single period is not very specific, in the sense that most frequencies around the base frequency of 1,500 cm$^{-1}$, have considerable effect on the scores of the periodic function. As the length of the loading function increases this effect changes as could be expected. The use of loading function of as little as 4 $2\pi$-periods shows a distinct "peak like" property, although with a considerable width, such that if it represented spectral resolution such spectrum would be difficult to interpret. The longest loading function represented is 32 $2\pi$-periods and this function represents a fairly narrow covariance function.

FIG. 2b shows covariance properties, in the same way as FIG. 2a, when using loading functions on the form of segments of single $2\pi$-period cosine functions. The outset is a loading function of 32 $2\pi$-periods, as given in FIG. 2a, where some of the $2\pi$-periods are cancelled (e.g. given the weight 0). The legend on the graphs (n) indicates the number of consecutive cancelled $2\pi$-periods, such that in (2) every other $2\pi$-period is used (using $2\pi$-periods 1,3,5 . . . ), in (4) every 4th period is used (1,5,9 . . . ) and so forth.

The graphs in FIG. 2b show, that as the number of $2\pi$-periods decreases, then the fundamental form of the covariance approaches that of a single $2\pi$-period. The number (and the position) of the additional periods defines a sort of "chopping" of the single $2\pi$-period.

Conclusion

The above shows, that various loading functions display different form of covariance, as defined in the present context. Where in spectroscopy such covariance is very undesirable, it is well established that it can easily be handled in a multivariate chemometrics model, e.g. through multivariate calibration such as PLS, PCA/PCR, ANN or the like. In fact, the use of selected loading functions, often with individual and optimised emphasis (e.g. through individual weighting), can offer several advantages over the use of un-weighted functions as in Inverse Fourier Transformation.

When developing chemometric models based on inverse Fourier Transformation spectral data, one typically selects a single or few frequencies, or at least excludes any spectral regions of no interest, for the model. This is often called "variable selection" and the goal is to improve prediction properties, such as accuracy and/or precision of the model in the prediction of future samples, by eliminating sources of information which carry limited or no information of relevance (e.g. are dominated by "noise" of some origin). The present invention offers the same property of "variable selection", but with the added feature of selecting interferogram data (e.g. segments) instead of only inner products of the entire interferogram and a frequency function, which are in principle equivalent to the result of an inverse Fourier Transformation of interferogram, to obtain "pure" spectral information.

Example 3

Calibration Model

An important feature of a multivariate calibration, e.g. as often performed in the field of chemometrics, with clear relevance to many of the preferred embodiments of the present invention is the feature of variable selection (variable in this context being determined or measured property of the sample, such as spectral feature or interference information). To some extent variable selection is the property of many of the traditional methods for model generation, e.g. by determining a weight of a variable at or close to zero, thus suppressing it. Often this feature is difficult to rely on entirely, mainly in the case of limited number of calibration or training samples. The reason is, that in the case of a great number of variables, such as several hundreds or even thousands, which is often the case, there can be significant probability that a random property (random in the sense of noise, or uncorrelated information) reflected in one or more of the variables is correlated to a parameter of interest. Therefore it is often the choice to eliminate one or more of the variables, prior to model generation.

To illustrate variable selection feature of the present invention, interferograms of 66 aqueous samples comprising between 0% and approximately 10% dissolved matter in various amounts (Lactose, Sucrose, Glucose, Fructose, Maltose, Triton X-100, PEG) were measured on a Bomem FT-IR spectrometer. The interferograms are double-sided "2 k interferograms" corresponding to about +/−0.06 cm OPD, obtained by adding 64 individual interferogram obtained from the measurement of approximately 50 μm aqueous film placed in the light path of the instrument. A spectrum typical of the system under investigation is shown in FIG. 3d, showing absorbance on the vertical (y-) axis as a function of wavenumber on the horizontal (x-) axis. This spectrum illustrates absorption features of the different components present in the sample referenced to pure water. The spectrum also illustrates the spectral property of water, most notable in the region around 1,650 cm$^{-1}$ and between 3,100 and 3,400 cm$^{-1}$, where the absorption of water is so strong that no significant spectral property can be determined.

One simple method for variable selection, is to in an iterative manner, to multiply variables with calibration weights in a PLS calibration, which adjusts the calibration weights to either approximately 1 (selected) or approximately 0 (not selected). The effect is a selection of a number of variables, where the number of selected variable is similar to the number of factors in the PLS model. This method has been used in the current example to illustrate variable selection in the calibration of Glucose. Performing variable selection on absorbance spectrum, selecting about 50 variables (the rank of the system is about 65) results in a selection indicated in FIG. 3d, by circles indicated selected variable. This variable selection indicates that variables in the regions 1,000 1,200, 1,400-1, 500 and 2,800-3,000 cm$^{-1}$ are most represented. These regions correspond to wavenumber regions where glucose has absorptions.

To demonstrate a possible variable selection according to the present invention, cosine loadings function were constructed for each frequency between 1,000 and 4,000 cm$^{-1}$ at 10 cm$^{-1}$ intervals. Loadings functions of 1, 4 and 16 2α-periods cosine functions were prepared. For each of the three different lengths of the loading function the score of these functions was determined for each measurement of each of the samples. At each frequency 20 scores were selected according to the method of iterative calibration weights. The selected scores are plotted in FIGS. 3a, 3b and 3c for loadings of length 1, 4 and 16 27α-periods respectively. From all of the selected scores of each loading length (a total 20 times 301 equal 6020 scores) scores were selected for PLS models of 5, 10, 15, 20 and 50 factors. From study of this system using PLS models on the absorbance data, it is known that initial PLS factors mainly harvests data representing average spectrum, while the later factors harvest data representing spectral features of glucose. Through calibration and prediction studies, suitable number of PLS factors for this system has been determined to be around 15 factors.

Figure 3A:
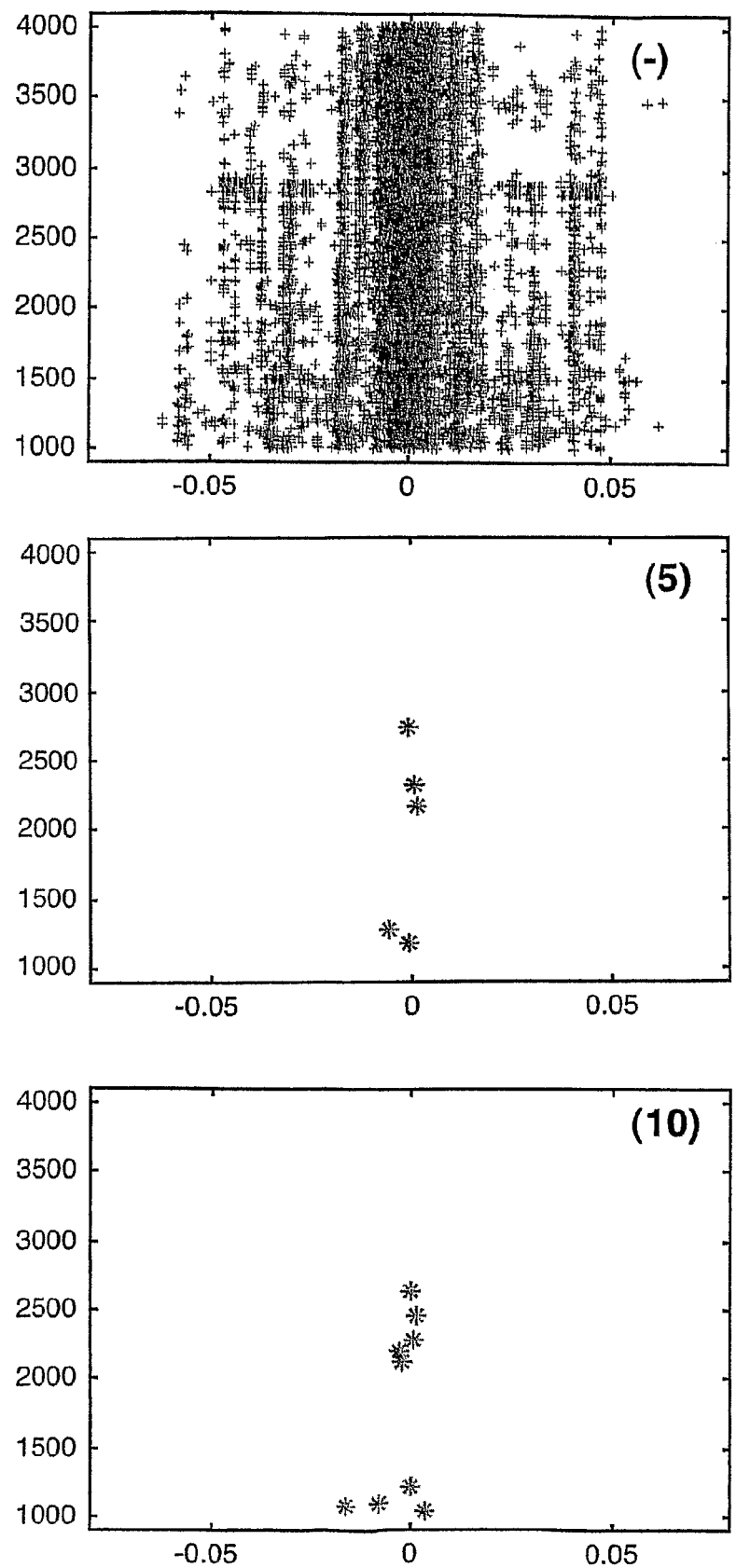
FIG. 3a Illustration of the selection of scores according to example 3.

The results using single 2π-period scores is shown in FIG. 3a. The graph labelled (-) shows all 20 scores selected from each of the frequencies. This graph illustrates that majority of the selected scores of each frequency are found around the centreburst (OPD=0). Selected variables for PLS model of 5 factors is presented in graph labelled (5). The selected scores are mainly close to centreburst with two off-centreburst location at low frequency (around 1,100 cm$^{-1}$). Similar results are found for selections corresponding to 10, 15 and 20 cm$^{-1}$, presented in graphs (10), (15) and (20) respectively. Finally selected scores using 50 PLS factors, which is close to the full rank of the system and thus prone to "over fitting", shows a high degree of scatter in along the OPD axis, but still reflects the general image of high density close to centreburst and scattering at low frequencies. These findings are in good agreement with the selection of frequencies on the bases of absorbance data, as presented in FIG. 3d.

Figure 3B:
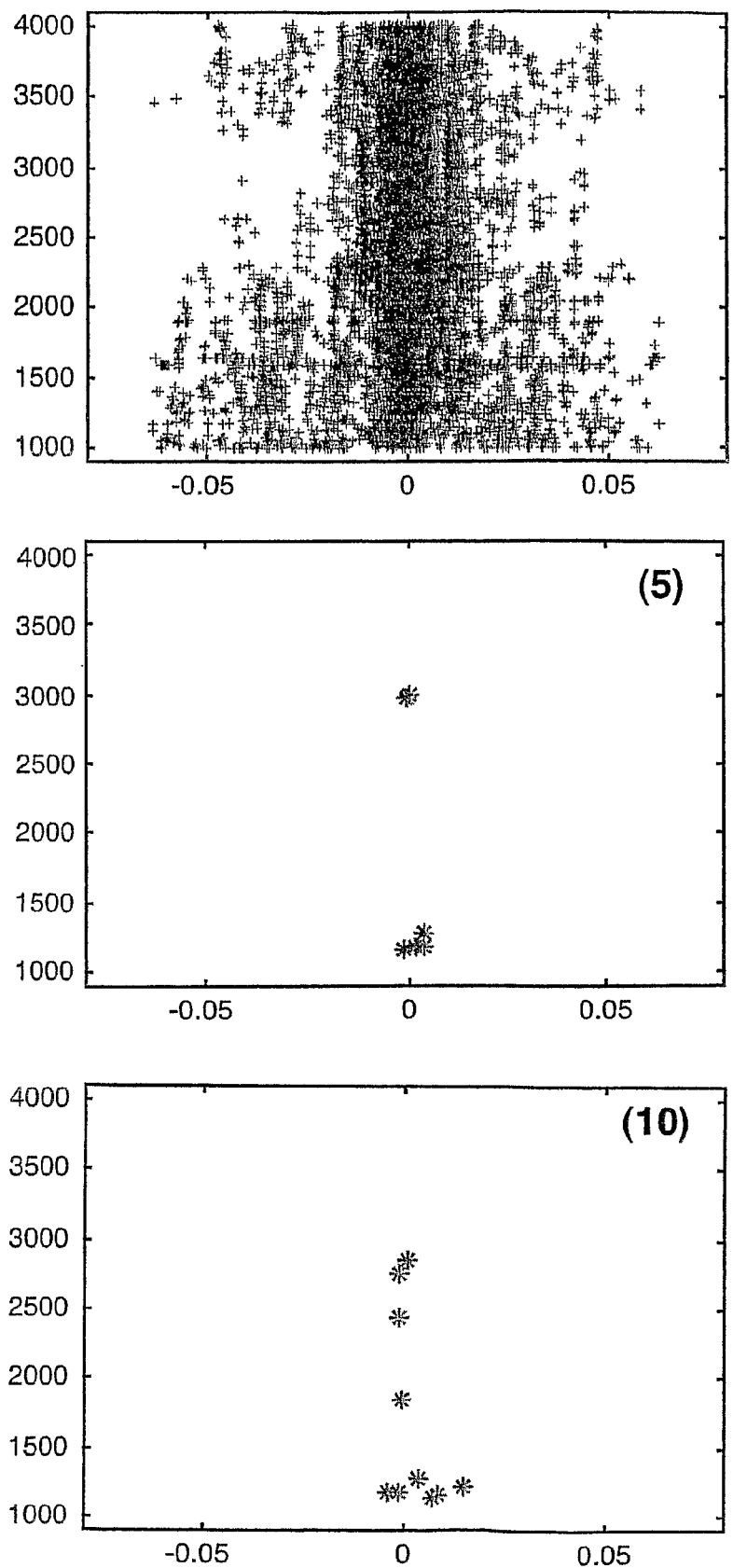
FIG. 3b Illustration of the selection of scores according to example 3.
Figure 3B:
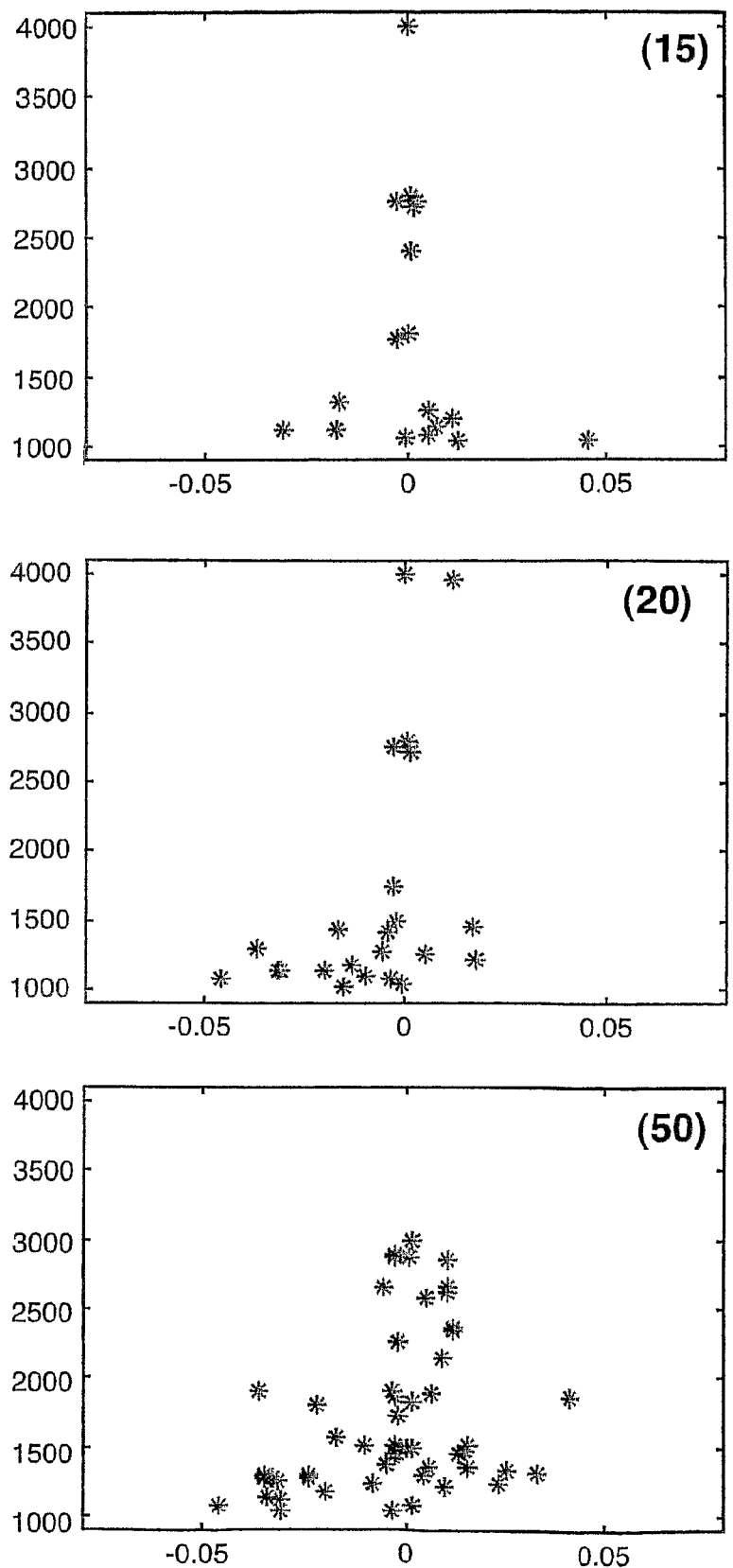
Figure 3C:
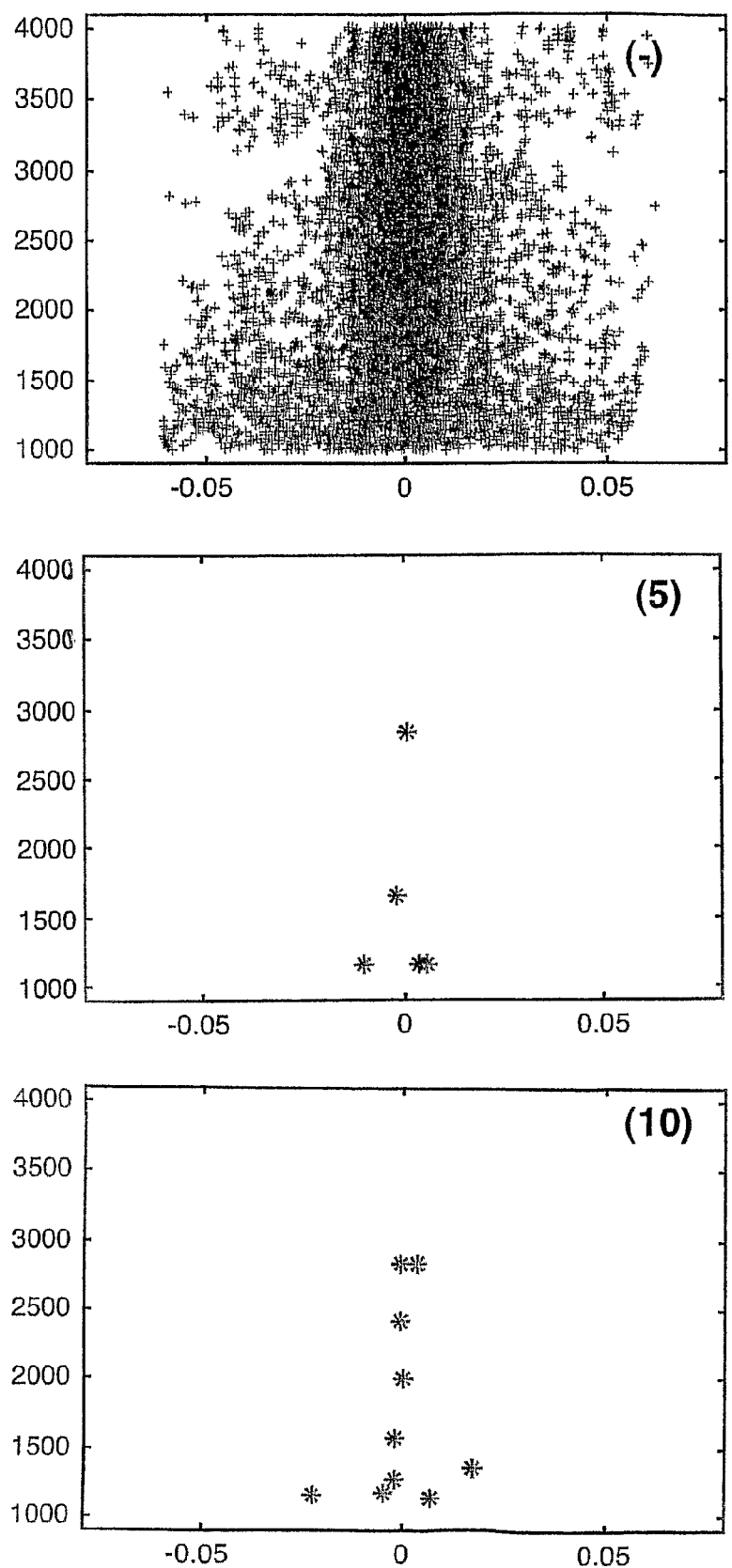
FIG. 3c Illustration of the selection of scores according to example 3.
Figure 3D:
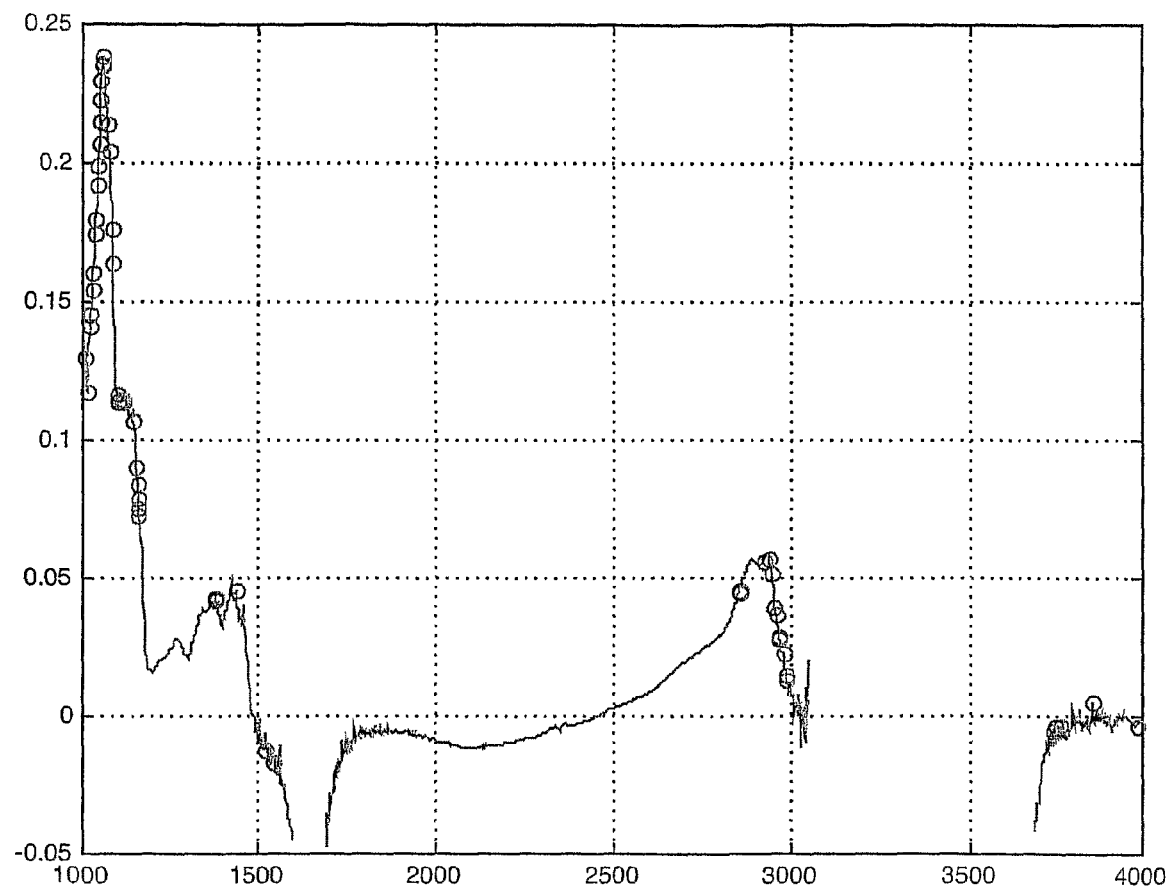
FIG. 3d A typical spectrum obtained by the instrument described in example 3, wherein the circles represent selected variables.

FIG. 3b, which presents data obtained using loadings of length 4 2π-periods, and FIG. 3c, which presents data obtained using loadings of length 16 2π-periods, give similar results as were obtained using only a single 2π-period. This suggests that variable selection according to the present invention is stable.

Investigation of the calibration models obtained using the selected scores reveals that the models perform in a satisfactory manner, rendering results similar to those obtained using spectral data, as known from prior art.

Conclusion

These findings show that methods according to the present invention are useful for the selection of variables. Methods based on the analysis of spectral data obtained by inverse Fourier Transformation are expected to give similar results as method using cosine loadings extended to the entire interferogram. Therefore method of the present invention, where preferably only sections of the interferogram are considered, allow for the possibility of obtaining variable selection which is superior to that of the spectral method, since it is possible to eliminate or suppress regions of the interferogram that do not contribute, in positive manner, to the performance of the model under consideration, Example 4

Prediction Model

The task of determining a chemical an/or physical property of a sample or a component of a sample using modulated information is the property of the different embodiments of the present invention. Several embodiments concern the use an interferometer for the modulation of electromagnetic energy, as for instance using a Michelson interferometer for the modulation of mid-IR light. The present example concerns the use of such modulated light, e.g. interferogram, for the determination of the glucose content of an aqueous sample. Interferograms of 66 aqueous samples comprising between 0% and approximately 10% dissolved matter in various amounts (Lactose, Sucrose, Glucose, Fructose, Maltose, Triton X-100, PEG) were measured on a Bomem FT-IR spectrometer. The collected interferograms are double-sided "2 k interferograms" corresponding to about +/−0.06 cm OPD, obtained by adding 64 individual interferogram obtained from the measurement of approximately 50 μm aqueous film placed in the light path of the instrument. In order to demonstrate the use of an interferogram with short OPD, only the centre section of the interferogram, equivalent to a 1 k interferogram or about +/−0.03 cm OPD, was selected for the generation of a multivariate model.

In the samples used, the different component show a high degree of overlapping spectral feature, to the extent that no specific spectral feature for e.g. glucose is present. This example thus illustrates a typical application, where high degree of colinear spectral property is between the different components of the sample.

The measured interferograms were used to construct a number of scores of 16 2π-period loading functions. These scores were determined for every 10 cm$^{-1}$ frequencies in the range from 1,000 to 4,000 cm$^{-1}$, or a total of 301 frequencies For each of the frequencies, 20 loading functions were selected, with fundamental frequency corresponding to the spectral frequency but with different position of each of the 16 2π-periods in the interferogram domain, using a method of variable selection, based on iterative PLS calibration, where the x-variables are scaled by the estimated calibration weights in each iteration, resulting in an set of calibration weights of values approximately 0 or 1, values close to 1 indicating selection of the corresponding variable, where the number of ones is approximately equal to the number of latent variables of the PLS model, e.g. PLS factors. This method was chosen due to its simplicity and its non-parametric property, e.g. no operator input is needed, beside the number of factors in the PLS model.

A further variable selection, was performed by subjecting the 301 times 20 scores (a total of 6020 scores) of the 66 samples to the method of iterative weighting of the calibration coefficients, this time using PLS model of 50 factors. This resulted in the selection of 54 loading functions.

Models were made using the two sets of scores from the selected loading functions. The known property of glucose was transformed by the function c'=10$^c$, where c is the concentration of glucose and c' is the transformed concentration of glucose. This function was chosen assuming Beer-Lambert relation between attenuation and concentration. The validity of this transformation is assumed, due to the moderate concentration of glucose, e.g. less than 5%.

The number of latent variables of the PLS models was determined using the method of cross-validation, performed by dividing the measurements up into 6 blocks. The cross-validation was performed by leaving one of the blocks out of the model and using it for prediction. This was repeated for each of the blocks, giving a total of 6 PLS models. For both models a total of 17 significant latent variables, e.g. PLS factors, was chosen. In relation to the number of chemical components in the samples (a total of 8 different compound), in addition to some additional variables, such as valying amount of $CO_2$ and $H_2O$ gas, possible temperature variation of the environment and so forth, this number is judged plausible. Increasing the complexity of the model beyond 17 latent variables is likely to introduce "overfit", e.g. inclusion of random property in the model, which can be difficult to identify in this example due to the relatively few samples used for the model generation.

Figure 4A:
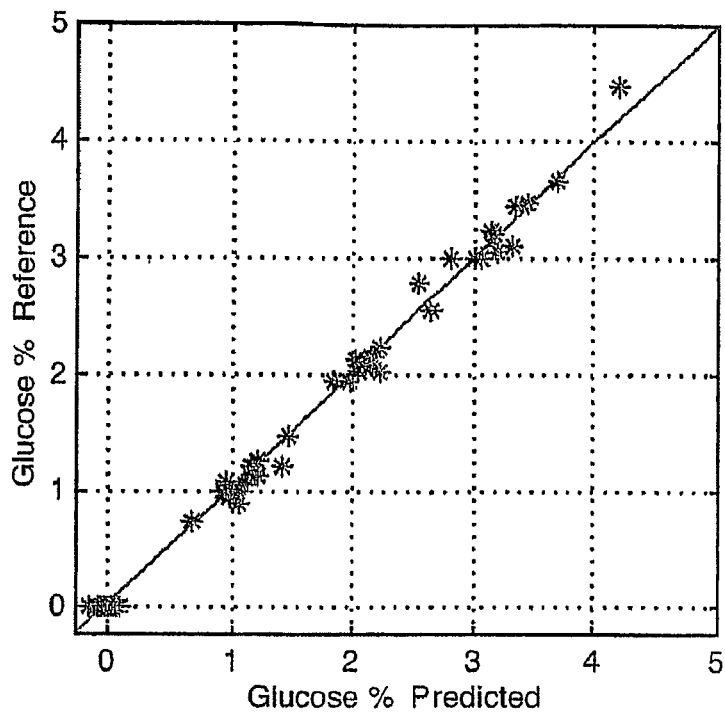
FIG. 4a Graph of the model described in example 4 using 6020 loading scores.
Figure 4B:
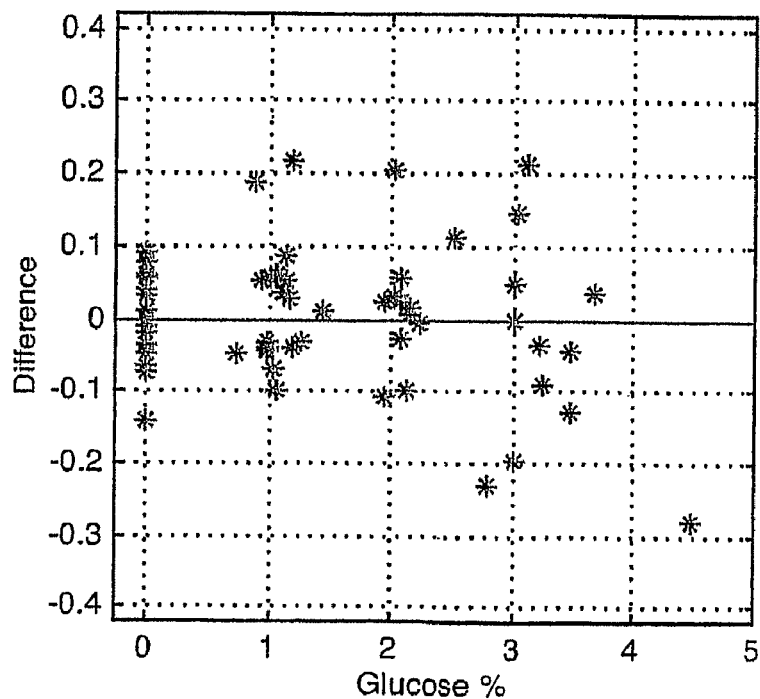
FIG. 4b Graph of the model described in example 4 using 6020 loading scores.

FIGS. 4a and 4b show graphs of the model using 6020 loading scores. The performance of the model, expressed as Root Mean Square Error of Cross Validation (RMSECV) was 0.094% glucose. The graph in FIG. 4a shows the correlation between the known, e.g. reference, and predicted glucose content of the samples and the graph in FIG. 4b shows the difference between the known and predicted values as a function of glucose concentration.

Figure 4C:
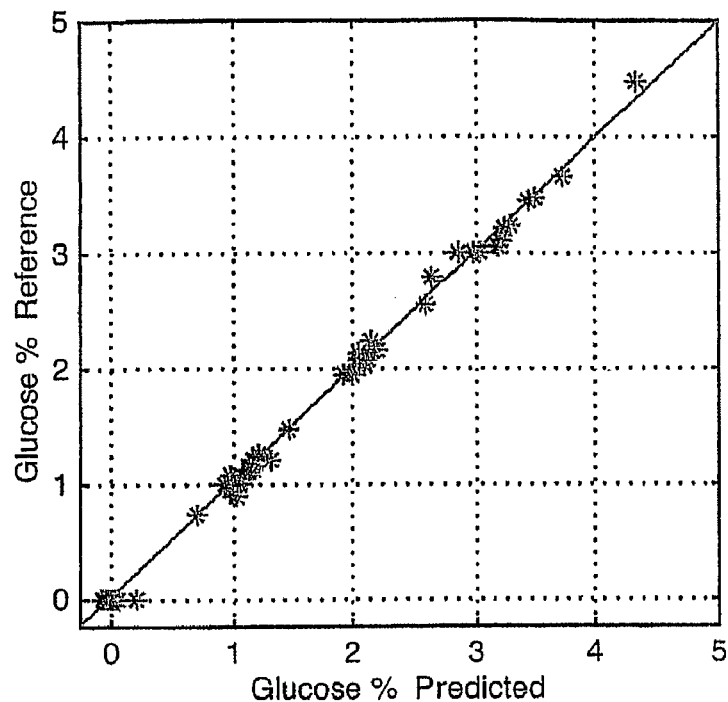
FIG. 4c Graph of the model described in example 4 using 50 loading scores.
Figure 4D:
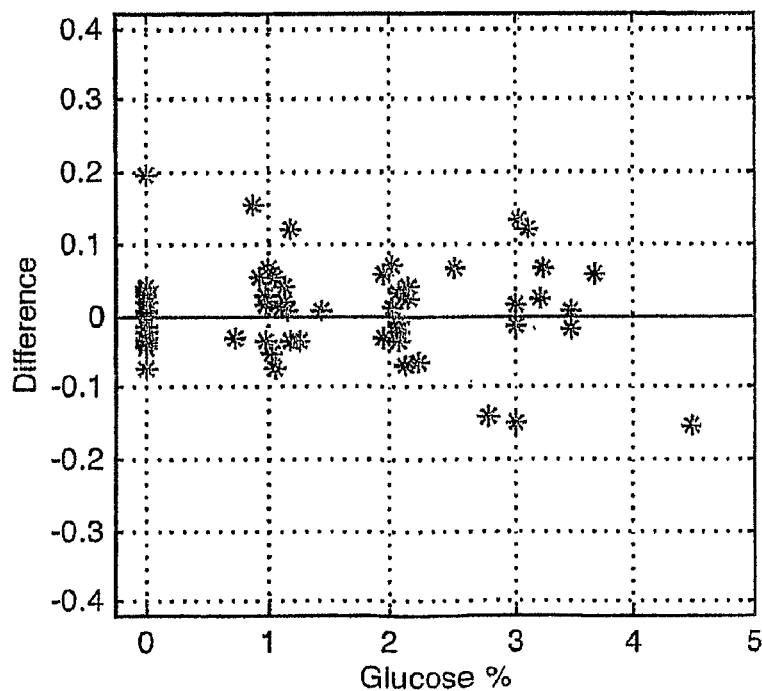
FIG. 4d Graph of the model described in example 4 using 50 loading scores.

FIGS. 4c and 4d show graphs of the model using 50 selected loading scores. The performance of the model, expressed as RMSECV was 0.065% glucose. The graph in FIG. 4c shows the correlation between the known, e.g. reference, and predicted glucose content of the samples and the graph in FIG. 4d shows the difference between the known and predicted values as a function of glucose concentration.

Conclusion

The results of the two models illustrate that methods of the present invention are suitable for the determination of properties based on modulated information. The embodiment at hand shows that it is possible to select a number of loading functions which when correlated to a chemical property make it possible determine the concentration of glucose in an aqueous sample. The present model was defined without no a priori knowledge of spectral properties of the sample. Further no attention was given to the optimisation of the loading functions, such as more precise base frequency of the cosine functions, the number of $2\pi$-periods, or the use of any other function than cosine. Such improvements were not deemed needed in the current implementation, mainly due to the limited size of the available calibration set.

I claim:

1. A method for the determination of chemical or physical property of a sample or a component of a sample comprising the steps of:
   a. obtaining an interferogram and/or at least one interferogram element corresponding to a modulation of electromagnetic signal emitted from, transmitted onto or through, or having interacted with at least a part of the sample,
   b. performing
      i. at least one transformation of the interferogram and/or a segment of the interferogram and/or an interferogram element with at least one function, wherein said function is capable of transforming an interferogram, an interferogram segment or element to a score, wherein a score is defined by $$\sum_i I(x_i) * f(x_i)$$

where I is interferogram data, f is function, x is domain of interferogram, and i is index to discrete interferogram elements,
      ii. optionally repeating i) for another segment of the interferogram and/or interferogram element,
   wherein the transformation does not comprise a Fourier Transformation if i) is conducted only once,
   thereby obtaining at least one score as defined by $$\sum_i I(x_i) * f(x_i)$$

where I is the interferogram data, f is the function, x is the domain of interferogram, and i is the index to discrete interferogram elements, and
   c. correlating said at least one score to the at least one chemical or physical property.

2. The method according to claim 1, where the interferogram comprises two or more interferogram elements representing substantially different status of modulation, preferably where the interferogram comprises three or more interferogram elements representing status of modulation at equal representation spacing of time, frequency, position or distance.

3. The method according to claim 2, where one or more interferogram elements represent status of modulation at time, frequency, position or distance not equally spaced relative to at least two different interferogram elements, preferably where the relative spacing has the purpose of improving representation of a feature in the interferogram.

4. The method according to claim 3, where spacing between interferogram elements is shorter in one section of the interferogram than in another section of the interferogram, preferably where the size of the section of shorter spacing corresponds to time, frequency, position or distance of at least one, preferably two or more, cycle(s) of the electromagnetic signal of highest frequency being considered, preferably where the section of shorter spacing is at or around the centre burst of an interferogram.

5. The method according to claim 1, where the modulated electromagnetic signals are in the frequency range of between 10,000 and 200 $cm^{-1}$, and modulating means are an interferometer modulating the light by means of combining light having travelled different distance (Optical Path Difference, OPD), the maximum OPD is preferably less than 1.0 cm, preferably where it is shorter than 0.8, 0.6, 0.5, 0.4, 0.3, 0.2 or even shorter than 0.1 cm, such as shorter than 0.08 cm, 0.07, 0.06, 0.05, 0.04, 0.03, 0.02 or shorter than 0.01 cm.

6. The method according to claim 1, where interference of modulated electromagnetic radiation is symmetric or substantially symmetric around a point in the interferogram domain, where the extent of representation of interferogram domain is equal or substantially equal in both directions relative to a symmetry point.

7. The method according to claim 1, where interference of modulated electromagnetic radiation is symmetric or substantially symmetric around a point in the interferogram domain, where the extent of representation of interferogram domain is unequal in the two directions relative to a symmetry point.

8. The method according to claim 7, where the point of symmetry in the interferogram domain is located at position in the interferogram of between 5% and 45% of the representation of the interferogram domain, relative to either extremes of the represented interferogram domain, preferably between 20% and 30% of the representation of the interferogram domain.

9. The method according to claim 7, where the point of symmetry in the interferogram domain is located at position in the interferogram at or closer than 20% of the representation of the interferogram domain from either extremes of the represented interferogram domain, preferably at or closer than 10% from either extremes of the represented interferogram domain.

10. The method according to claim 1, where the interferogram is transformed into frequency intensities using the method of fast fourier transformation, preferably where the property of the sample or a component of the sample is a determination of absorption, transmission or emission spectrum.

11. The method according to claim 1, where spectral property is the result of an inner product of the interferogram and a loading function, i.e. score value.

12. The method according to claim 11, where the loading function is determined through calibration, preferably where the purpose of the calibration is to substantially optimise the determination of chemical or physical property of a sample or a component of a sample.

13. The method according to claim 11, where the loading function is a periodic function, preferably where the periodic function has 2 or more periods represented in the interferogram, such as 4 or more periods represented in the interferogram, such as 8 or more periods represented in the interferogram, such as 16 or more periods represented in the interferogram, preferably where the periodic functions are cosine or sine functions.

14. The method according to claim 11, where the loading function is symmetrical, preferably where sum of the loading function is substantially equal to zero.

15. The method according to claim 11, where scores are used to determine absorption, transmission or emission properties of sample or component of a sample.

16. The method according to claim 1, where interferogram and/or loadings and/or scores are scaled prior to transformation to spectral property, preferably where purpose of scaling is to obtain substantially improved stability and/or reliability in correlation of spectral property to chemical or physical property, preferably were scaling partially or substantially compensates for variations affecting the correlation.

17. The method according to claim 16, where scaling is determined on bases of information reflecting the status of the measuring system, preferably where scaling is determined on bases of properties reflected in the interferogram.

18. The method according to claim 16, where the scaling has the purpose of relating interferogram and/or loading and/or score to corresponding properties obtained through measurement of reference material or reference conditions of the measuring system, preferably where the reference material represents sample substantially without chemical or physical component, e.g. a sample blind.

19. The method according to claim 1, where interferogram and/or loading and/or score are subjected to predetermined numerical function, preferably where the numerical function transforms information in such a manner that it corresponds better to a chemical or physical property, more preferably were the numerical function transforms information in such a manner that it is corresponds substantially linear to chemical or physical property.

20. The method according to claim 1, where a measured interferogram is subjected to transformation, preferably where the purpose of the transformation is to represent the observations in the interferogram as measured on a first instrument as if it was obtained on a second instrument, preferably where the purpose is to improve statistical quality of a determination using a determination model developed using the second instrument.

21. The method according to claim 20, where the property of the transformation is determined on status of the first instrument relative to a status of the second instrument.

22. The method according to claim 20, where the property of the transformation or status of the first instrument is determined on the bases of the measured interferogram, preferably where it is determined on the bases of one or several previously measured interferogram(s).

23. The method according to claim 1, where a loading, a part of a model for determination based on measurements on a first instrument, is subjected to transformation, preferably where the purpose of the transformation is to represent the determination derived from measurement on a second instrument as if it was obtained on a first instrument, preferably where the purpose is to improve statistical quality of a determination using a determination model developed using the first instrument.

24. The method according to claim 23, where the property of the transformation is determined by status of the first instrument relative to a status of the second instrument.

25. The method according to claim 23, where the property of the transformation or status of the second instrument is determined on the bases of the measured interferogram, preferably where it is determined on the bases of one or several previously measured interferogram(s).

26. The method according to claim 1, where a model for determination is developed on a first instrument, preferably by calibration including known properties of samples relating to chemical or physical property of the sample or a component of the sample and one, preferably several measurement these samples, preferably where the properties of the model allow it to be applied to measurements on a second instrument, substantially without any a priori knowledge of the status of the second instrument, more preferably by including a priori knowledge of the status of the second instrument.

27. The method according to claim 1, where determination of chemical or physical property is preformed by applying predetermined prediction model to interferogram and/or spectral property, preferably where the prediction model is determined through calibration, preferably where the calibration is a multivariate calibration, such as PLS, PCA, LS, ANN, PARAFAC, Tucker3.

28. The method according to claim 1, wherein the sample is a sample representing one of the following: Aqueous sample, such as environmental sample, drinking water, bathing water, process water, cooling water; Biological sample, such as tissue sample, blood sample, urine sample, feces sample, cell culture sample, bacteria culture, yeast culture; Industrial sample such as oil sample, petroleum sample, grease sample, pharmaceutical sample; Food sample such as milk sample, dairy product sample, meat sample, fish sample, fruit sample, vegetable sample; Gaseous sample such as exhaust gas, fermentation gas, combustible gas.

29. The method according to claim 1, wherein the chemical or physical property being assessed is one of the following: spectral property, temperature, turbidity, total organic material, dry material, dissolved material, chlorophyll, fibres, amino acids, proteins, fat, fatty acids, lipids, glyserids, cholesterol, enzymes, sugars, glucose, alcohols, ethanol, methanol, acids, citric acid, acidic acid, aliphats, aromats, ketones, aldehydes, pH, density, salinity, colour.

30. The method according to claim 1 where electromagnetic signal is in one or several of the following spectral rage(s) X-Ray, UV/Vis, Near-IR, Mid-IR, Far-IR, microwave, radio frequency.

31. The method according to claim 1 where the interferogram is obtained in connection with one or several of the following spectroscopic methods, absorption, transmission, reflection, emission.

32. The method according to claim 31 where the interferogram reflects detection of one or several phenomena, photons, heat, pressure.

33. The method according to claim 1 where the property which is determined is a chemical or physical property of a food or feed sample, preferably where the food or feed sample is one or several of the following, fruit juice, milk, milk product, grain, cereals.

34. The method according to claim 1 where the property which is determined is a chemical or physical property of a beverages sample, preferably where the beverages sample is one or several of the following, juice, soft drink, beer, wine, spirits.

35. The method according to claim 1 where the property which is determined is a chemical or physical property of a pharmaceutical sample, preferably where the pharmaceutical sample is one or several of the following, raw material used in the production of pharmaceutical product, intermediate product in the production of pharmaceutical product, pharmaceutical product.

36. The method according to claim 1 where the property which is determined is a chemical or physical property of a biological sample, preferably where the biological sample is one or several of the following, tissue sample, blood sample, urine sample, feces sample, preferably where the sample is of human or veterinary origin.

37. The method according to claim 1 where the property which is determined is a chemical or physical property of an environmental sample, preferably where the n environmental sample is one or several of the following, soil, aqueous liquid, gas.

38. The method according to claim 1 where the property which is determined is a state or a property of a location, preferably where the state or property of a location is one or several of the following, pre-stages to a fire, fire, chemical spillage, water spillage, preferably where the interferogram is obtained as a result of passive remote sensing.

39. The method of claim 1, wherein said at least one function is at least one loading function.

40. The method of claim 1, wherein said at least one function is a sine or cosine at frequency between two Fourier transform frequencies set by the length of the interferogram.

41. The method of claim 1, wherein said at least one function comprises at least three cosine or sine functions unevenly spaced in frequency.

42. The method of claim 1, wherein said transformation comprises calculating the inner product between the said interferogram and the respective function.

43. The method of claim 1, wherein said at least one function is substantially balanced.

44. The method of claim 1, wherein said at least one function is apodized.

45. The method of claim 1, wherein said at least one function is at least one segment of a periodic function such as a cosine and zero for other values.

46. The method of claim 1, wherein said at least one function is a Dirac or Kronecker delta function.

47. The method claim 1, wherein said at least one function is an analytically defined function.

48. The method of claim 1, wherein said at least one function comprises a discrete data set.

49. The method of claim 48, wherein said at least one function is a loading function found by multivariate calibration.

50. The method of claim 1, wherein said at least one function is different from as sine or cosine.

51. The method of claim 1, wherein the interferogram or interferogram segment is sampled with varying density and/or unevenly distribution.

52. The method of claim 1, further comprising a step of estimating each data points forming the interferogram, segment of the interferogram or interferogram element based on at least one proximal data point.

53. The method of claim 48, wherein the said discrete data set is found by estimating each data point from proximal data points in the interferogram domain to match the position in the modulation domain of the data points obtained in the said interferogram, segment of the interferogram or interferogram element.

54. A system for the determination of chemical or physical property of a sample or a component of a sample comprising
   an interferometer for obtaining an interferogram and/or at least one interferogram element corresponding to a modulation of electromagnetic signal emitted from, transmitted onto or through, or having interacted with at least a part of the sample,
   a. processor for performing
      i. at least one transformation of the interferogram and/or a segment of the interferogram and/or an interferogram element with at least one function, wherein said function is defined as in claim 1,
      ii. optionally repeating i) for another segment of the interferogram and/or interferogram element,
   wherein the transformation does not comprise a Fourier Transformation if i) is conducted only once,
   said processor including means for obtaining at least one score as defined in claim 1, and
   b. means for correlating said at least one score to the at least one chemical or physical property.

55. The system according to claim 54, further comprising means for performing one or more interferogram elements representing substantially different status of modulation.

* * * * *